J. M. LEAVER, Jr.

AUTOMATIC BUNDLING AND TYING MACHINE.

APPLICATION FILED APR. 19, 1920.

Reissued May 24, 1921.

15,111.

16 SHEETS—SHEET 1.

James M. Leaver, Jr.,
INVENTOR

WITNESSES
Charles H. Durand
Philip E. Siggers

BY E. G. Siggers
ATTORNEY

J. M. LEAVER, Jr.

AUTOMATIC BUNDLING AND TYING MACHINE.

APPLICATION FILED APR. 19, 1920.

Reissued May 24, 1921.

15,111.

16 SHEETS—SHEET 2.

James M. Leaver, Jr.,
INVENTOR

WITNESSES
Charles H. Durand
Philip E. Siggers

BY E. G. Siggers
ATTORNEY

J. M. LEAVER, Jr.

AUTOMATIC BUNDLING AND TYING MACHINE.

APPLICATION FILED APR. 19, 1920.

Reissued May 24, 1921.

15,111.

16 SHEETS—SHEET 3.

James M. Leaver, Jr.
INVENTOR

WITNESSES
Charles H. Durand
Philip E. Siggers

BY E. G. Siggers
ATTORNEY

J. M. LEAVER, Jr.

AUTOMATIC BUNDLING AND TYING MACHINE.

APPLICATION FILED APR. 19, 1920.

Reissued May 24, 1921.

15,111.

16 SHEETS—SHEET 4.

James M. Leaver, Jr., INVENTOR

WITNESSES

Charles N. Durand

Philip E. Siggers

BY E. G. Siggers

ATTORNEY

J. M. LEAVER, Jr.

AUTOMATIC BUNDLING AND TYING MACHINE.

APPLICATION FILED APR. 19, 1920.

Reissued May 24, 1921. 15,111.

16 SHEETS—SHEET 5.

WITNESSES

Charles N. Durand

Philip E. Siggers

James M. Leaver, Jr.,

INVENTOR

BY E. G. Siggers

ATTORNEY

J. M. LEAVER, Jr.

AUTOMATIC BUNDLING AND TYING MACHINE.

APPLICATION FILED APR. 19, 1920.

Reissued May 24, 1921.

15,111.

16 SHEETS—SHEET 6.

WITNESSES

Charles H. Durand

Philip E. Siggers

James M. Leaver, Jr., INVENTOR

BY E. G. Siggers

ATTORNEY

J. M. LEAVER, Jr.

AUTOMATIC BUNDLING AND TYING MACHINE.

APPLICATION FILED APR. 19, 1920.

Reissued May 24, 1921. 15,111.

16 SHEETS—SHEET 7.

WITNESSES

Charles H. Durand

Philip E. Siggers

James M. Leaver, Jr.
INVENTOR

BY E. G. Siggers
ATTORNEY

J. M. LEAVER, Jr.

AUTOMATIC BUNDLING AND TYING MACHINE.

APPLICATION FILED APR. 19, 1920.

Reissued May 24, 1921. 15,111.

16 SHEETS—SHEET 8.

WITNESSES

Charles N. Durand

Philip E. Siggers

INVENTOR

James M. Leaver, Jr.,

BY E. G. Siggers

ATTORNEY

J. M. LEAVER, Jr.

AUTOMATIC BUNDLING AND TYING MACHINE.

APPLICATION FILED APR. 19, 1920.

Reissued May 24, 1921.

15,111.

16 SHEETS—SHEET 9.

James M. Leaver, Jr., INVENTOR

BY E. G. Siggers

ATTORNEY

WITNESSES

Charles H. Durand

Philip E. Siggers

J. M. LEAVER, Jr.

AUTOMATIC BUNDLING AND TYING MACHINE.

APPLICATION FILED APR. 19, 1920.

Reissued May 24, 1921.

15,111.

16 SHEETS—SHEET 10.

James M. Leaver, Jr., INVENTOR

WITNESSES

Charles H. Durand

Philip E. Siggers

BY E. G. Siggers

ATTORNEY

J. M. LEAVER, Jr.

AUTOMATIC BUNDLING AND TYING MACHINE.

APPLICATION FILED APR. 19, 1920.

Reissued May 24, 1921. 15,111.

16 SHEETS—SHEET 11.

James M. Leaver, Jr.,
INVENTOR

WITNESSES
Charles H. Duranu
Philip E. Siggers

BY E. G. Siggers
ATTORNEY

J. M. LEAVER, Jr.
AUTOMATIC BUNDLING AND TYING MACHINE.
APPLICATION FILED APR. 19, 1920.
Reissued May 24, 1921. 15,111.
16 SHEETS—SHEET 12.
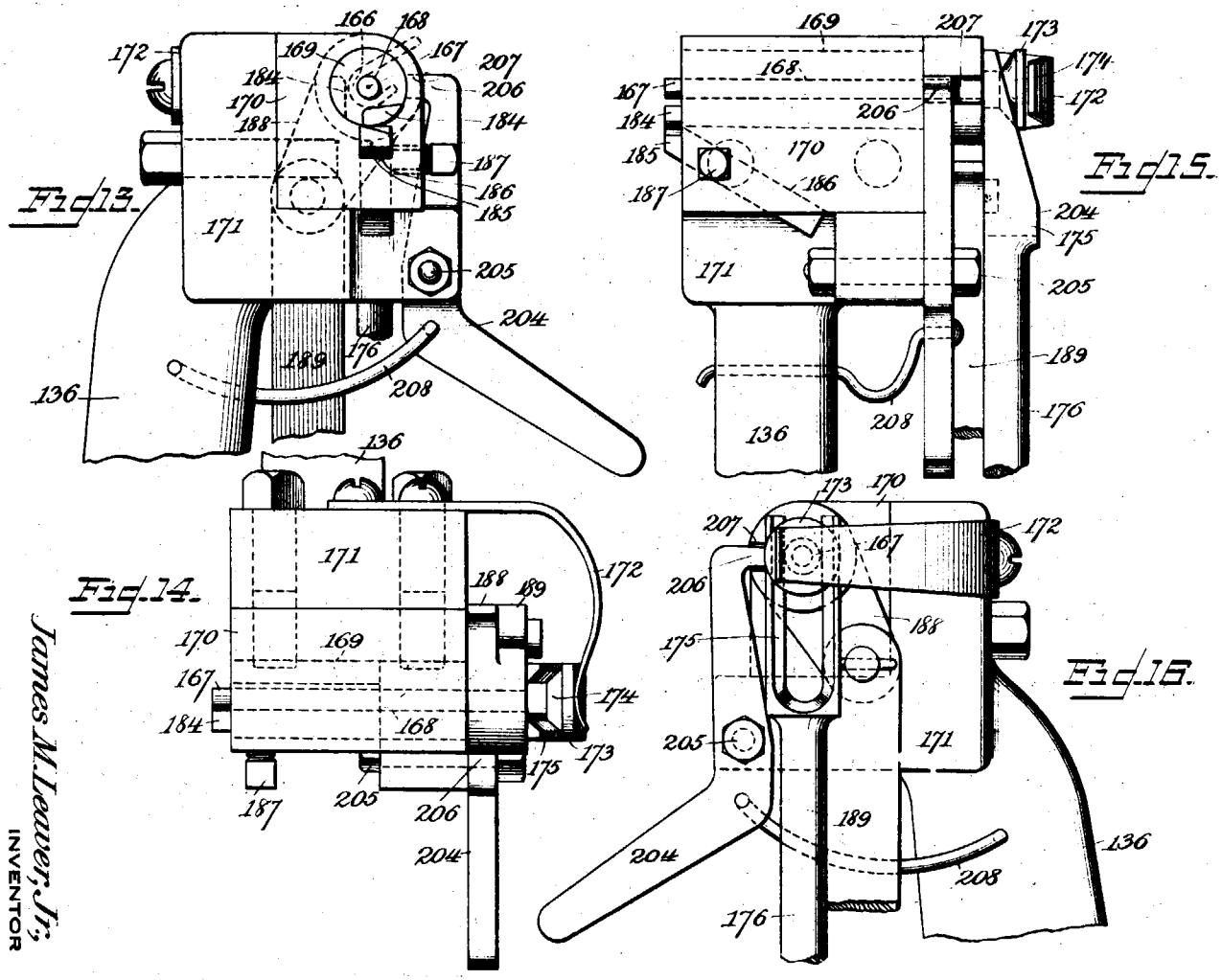
James M. Leaver, Jr.,
INVENTOR
WITNESSES
Charles H. Durand
Philip E. Siggers
BY E. G. Siggers
ATTORNEY J. M. LEAVER, Jr.
AUTOMATIC BUNDLING AND TYING MACHINE.
APPLICATION FILED APR. 19, 1920.
Reissued May 24, 1921. 15,111.
16 SHEETS—SHEET 13.
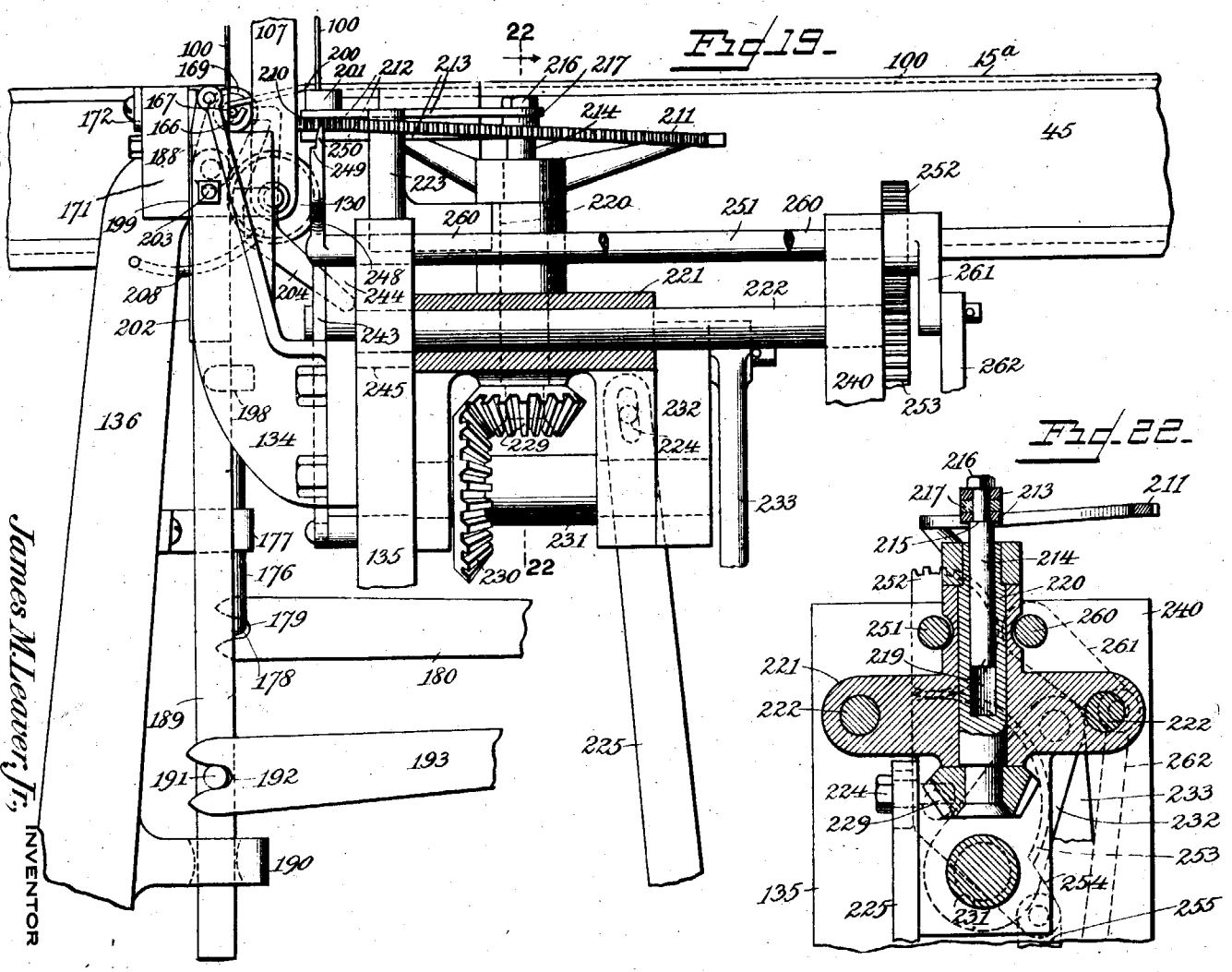
WITNESSES
Charles H. Durand
Philip E. Siggers
James M. Leaver, Jr., INVENTOR
BY E. G. Siggers
ATTORNEY J. M. LEAVER, Jr.

AUTOMATIC BUNDLING AND TYING MACHINE.

APPLICATION FILED APR. 19, 1920.

Reissued May 24, 1921.

15,111.

16 SHEETS—SHEET 14.

WITNESSES

Charles H. Durand

Philip E. Siggers

James M. Leaver, Jr., INVENTOR

BY E. G. Siggers

ATTORNEY

J. M. LEAVER, Jr.
AUTOMATIC BUNDLING AND TYING MACHINE.
APPLICATION FILED APR. 19, 1920.
Reissued May 24, 1921. 15,111.
16 SHEETS—SHEET 15.
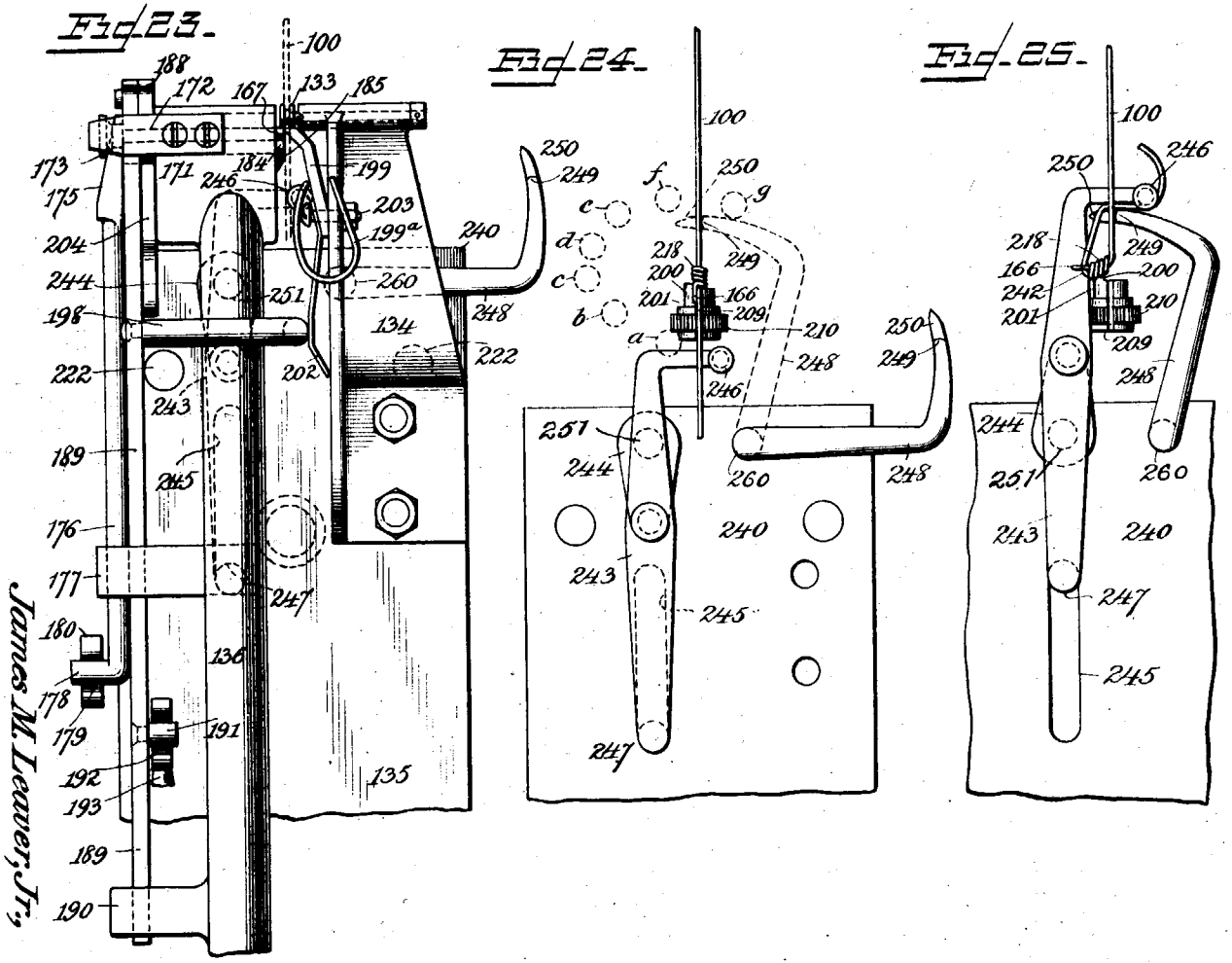
James M. Leaver, Jr.,
INVENTOR
WITNESSES
Charles H. Durand
Philip E. Siggers
BY E. G. Siggers
ATTORNEY J. M. LEAVER, Jr.
AUTOMATIC BUNDLING AND TYING MACHINE.
APPLICATION FILED APR. 19, 1920.
Reissued May 24, 1921. 15,111.
16 SHEETS—SHEET 16.
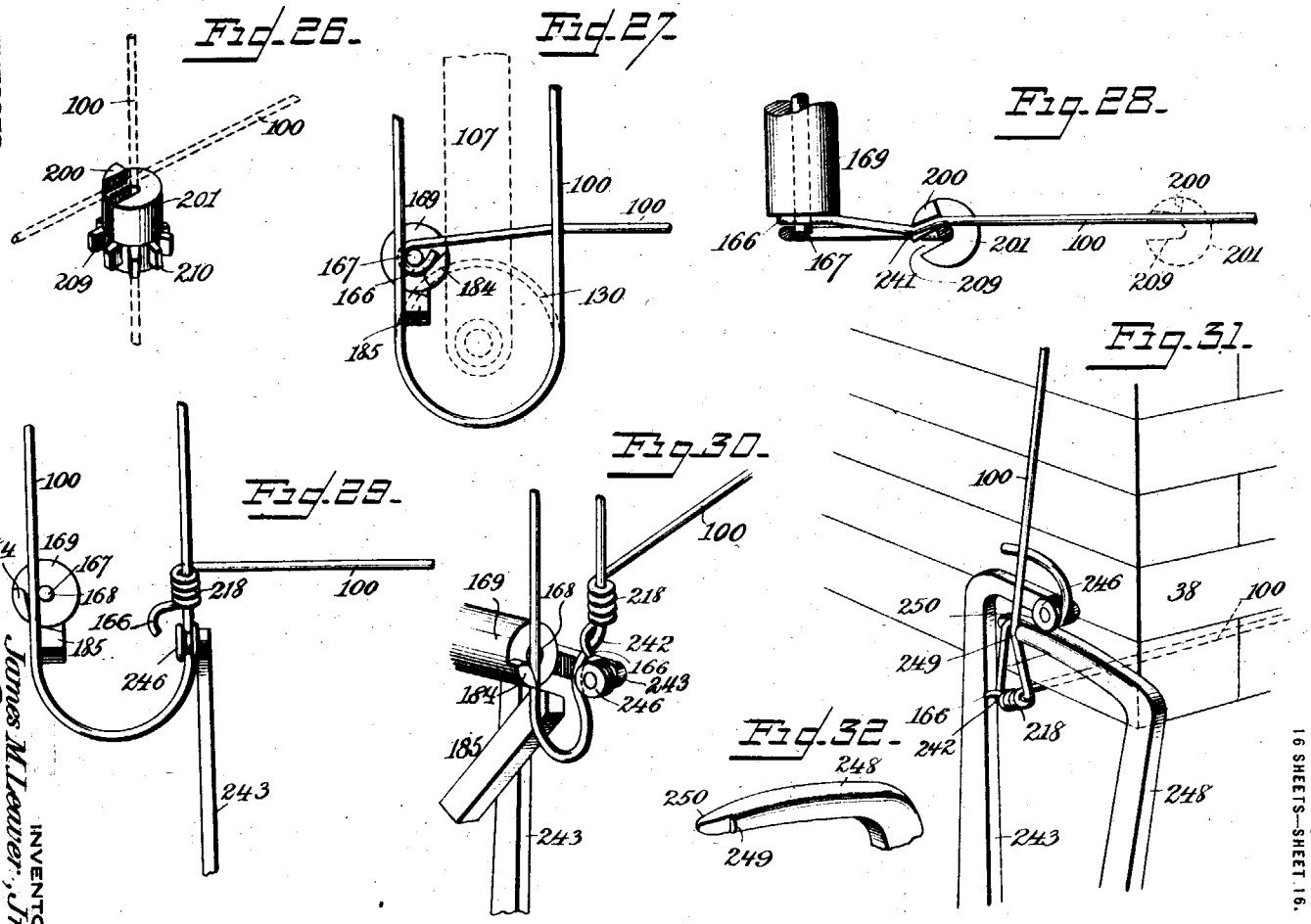
WITNESSES
Charles H. Durand
Philip E. Siggers
INVENTOR
James M. Leaver, Jr.,
BY E. G. Siggers
ATTORNEY

UNITED STATES PATENT OFFICE.

JAMES MARSHALL LEAVER, JR., OF OAKLAND, CALIFORNIA.

AUTOMATIC BUNDLING AND TYING MACHINE.

15,111. Specification of Reissued Letters Patent. Reissued May 24, 1921.

Original No. 1,295,531, dated February 25, 1919, Serial No. 137,876, filed December 19, 1916. Application for reissue filed April 19, 1920. Serial No. 375,163.

*To all whom it may concern:*

Be it known that I, JAMES M. LEAVER, Jr., a citizen of the United States, residing at Oakland, in the county of Alameda and State of California, have invented a new and useful Automatic Bundling and Tying Machine, of which the following is a specification.

The invention relates to an automatic bundling and tying machine.

An object of the present invention is to provide an efficient machine designed for bundling and tying cut lumber and various other materials, and capable of automatic operation to form bundles of uniform size, to bind the bundles with wire and tie the ends of the wire without overtaxing the wire or distorting the same or putting undue tension on any part of the band or knot so that the terminal strain will be not greater in the knot than elsewhere on the wire, and there will be no liability of weakening or breaking the wire. An additional object is to provide a novel knotting mechanism, one which differs from all others in coiling one end of a wire about a section of the wire, and which insures a tight knot such that no amount of strain can untwist. A further object is to provide adjustable mechanism for automatically engaging a predetermined amount of relatively incompressible material in a magazine, removing it therefrom and presenting it in bundle form to the binding means, and binding the material under a constant tension without slackening or loosening the bands, thereby insuring a compact and perfectly formed bundle when non-expansible or inelastic material is handled. It is also the object of the invention to enable bundles to be tied with any desired number of bands spaced the proper distance apart, and to bind and tie the bundles tightly without either drawing the wire over the material and injuring the same, or allowing any slack after the knot is tied, thereby making a firm, compact and strong bundle. Furthermore, the invention is designed to provide a machine in which no skill is required in tying the bundles and in which there will be no danger of breaking the wire by careless operation of the machine.

The machine of the present invention is fundamentally designed to bind material of an inexpansible and incompressible nature, such as lumber, or articles of a definite form which have those characteristics. Being so designed, it has no provision whatever for compressing the material to be tied, in contradistinction to baling presses which are incapable of forming bundles without first compressing the material and afterward allowing it to expand against the binding elements. The present application is limited to means for binding and tying definite objects, examples of which are a bundle of shooks, a box, and the like. Baling presses take bunches of loose material and pack them in layers in a bundle-forming chamber, which also constitutes the binding chamber. When the bundle is completed, the binding is completed and the compressed material expands against the loose bands to form the bale. The present invention takes bundles or articles of a predetermined size and shape and binds and ties them without changing their size and shape. The mechanism for forming the bundles shown in the accompanying drawings and described below is in fact a separate and distinct invention capable of embodiment in a separate machine and forming no part of the present invention. The material or article to be bound by my machine is an entity before it is moved into the binding chamber, and necessarily so since the present machine pushes the material or article against a wire or wires maintained under a considerable and constant tension.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawings:—

Fig. 13 is a detail elevation of the mechanism carried by the head of the wire extension lever.

Fig. 14 is a detail plan of the mechanism shown in Fig. 13.

Fig. 15 is a view similar to Fig. 13, but looking from the left side.

Fig. 16 is a view of the reverse side of the parts of Fig. 13

Fig. 19 is an enlarged detail view partly in section, illustrating the construction of the wire coiling mechanism and the position of the parts prior to coiling a terminal of a wire around the vertical section thereof.

Fig. 22 is vertical sectional view of the wire knotting mechanism, the section being taken on the line 22—22 of Fig. 19.

Fig. 23 is an enlarged detail elevation of the knotting mechanism.

Figs. 24 and 25 are detail views, showing different positions of the wire tucking mechanism.

Fig. 26 is a detail perspective view of the wire coiler.

Fig. 27 is a detail view, showing the looped end of the wire and illustrating the relative position of the vertical strands carried down by the needle bar immediately before the wire is coiled.

Fig. 28 is a detail view, illustrating the relative position of the coiler and the horizontal section of the wire and showing the bend made by the slight initial movement of the coiler to prevent the wire when severed from slipping Fig. 29 is a detail view, illustrating the position of the parts after the coiling of the wire and prior to the severing and tucking of the vertical wire section.

Fig. 30 is a detail perspective view, showing the mechanism in the act of severing the wire preparatory to tucking the same.

Fig. 31 is a detail perspective view, illustrating the parts near the completion of the tucking operation.

Fig. 32 is a detail perspective view of the outer portion of the band engaging finger.

Figure 1:
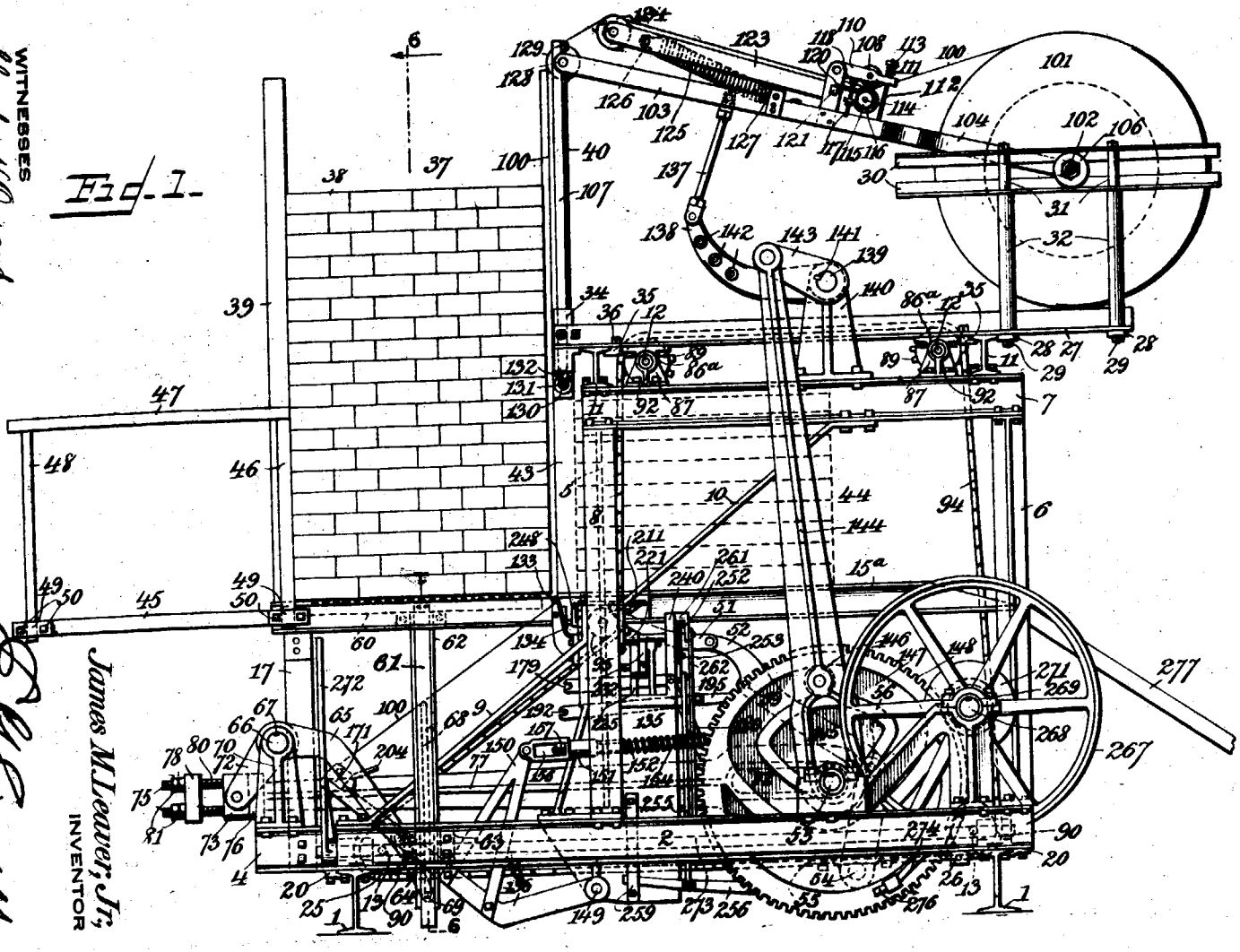
Figure 1 is a side elevation of an automatic bundling and tying machine, constructed in accordance with this invention, and illustrating the initial positions of the parts.

In the accompanying drawings in which is illustrated the preferred embodiment of the invention, the main frame of the machine, which may be constructed of any suitable material, is provided at the base with front and rear transversely disposed I-beams 1, Figs. 1 to 6, which may be either mounted on blocks or sills, or equipped with casters to render the machine portable. The front and rear transverse beams are connected at their ends by side longitudinal beams 2 and 3, and at a point between their ends by an intermediate longitudinal beam 4. See Figs. 4 and 5. The main frame is provided at a point intermediate of the ends of the side beam 3 and intermediate beam 4 with front vertical column 5, see Fig. 2 and at the rear ends of said beams 3 and 4 with rear vertical columns 6, Figs. 1 to 4. The front and rear columns, which are secured at their lower ends to the upper flanges of the longitudinal beams 3 and 4, support spaced longitudinal beams 7, which are secured to the upper ends of the columns 5 and 6. The main frame is stiffened by an inclined transverse brace 8, see Figs. 1 and 4, secured at its lower end to the side longitudinal beam 2 and extending upwardly and inwardly therefrom to the upper longitudinal beam of the adjacent side of the frame and suitably secured to the same. The main frame is also stiffened by upper and lower inclined longitudinal braces 9 and 10, see Fig. 1, arranged in substantially the same inclined plane. The lower inclined brace 9 extends upwardly and rearwardly from the central portion of such front column to the underside of the adjacent top longitudinal beam 4 and is secured to the adjacent front column 5 at a point intermediate of the ends thereof, and the upper brace 10 extends upwardly and rearwardly from the central portion of such front column to the underside of the adjacent top longitudinal beam 7, and its upper end is secured to the same near the center of the said beam 7. The top longitudinal beam 7 is connected at points intermediate of its ends by top transversely disposed I-beams 11, secured to the longitudinal beam 7 and located at the front ends thereof at a point adjacent the rear ends of the same. The main frame may, of course, be of any other preferred construction.

The bottom transverse beams 1 and the top transverse beams 11 constitute rails and form transverse tracks for slidably mounting a plurality of laterally adjusted upper and lower auxiliary frames or supports, which carry the mechanism for forming the bundles, placing the bands around the same and tying the ends of the bands. In the accompanying drawings, Figs. 4 and 5, two laterally adjustable sets of upper and lower auxiliary frames or supports are shown for tying a bundle at spaced points at opposite sides of the center, and these auxiliary frames are adjustable by means of upper and lower right and left hand threaded screws 12 and 13, which, when operated by the means hereinafter described, move the sets of frames as units simultaneously toward and from each other. The machine may be equipped with any number of sets of upper and lower auxiliary frames. When three sets of such frames are employed, one set may be located at the center of the machine and there held stationary, while the side sets of auxiliary frames or supports will be adjustable toward and from the central set of auxiliary frames or supports. (An alternative arrangement would be to have one end set stationary, and the other two sets relatively adjustable.)

The lower auxiliary frame of each set is provided at the bottom with spaced longitudinal channel bars 14 and 15, see Figs. 3 to 9, and at the top with a longitudinal channel bar 15*, located above and in substantially the vertical plane of the lower channel bar 14 and connected with the same at the ends of the lower auxiliary frame by front and rear upright bars 16 and with the ends of the other lower channel bar 15 by inclined transverse braces 17. The lower channel bars 14 and 15 are connected by transverse rods 18, arranged in pairs and secured to the channel bars at the inner faces thereof by screws 19, piercing the webs of the channel bars 14 and 15 and engaging threaded sockets in the ends of the transverse rods 18, but any other suitable means may, of course, be employed for connecting the channel bars and for maintaining the same in spaced relation.

Figure 3:
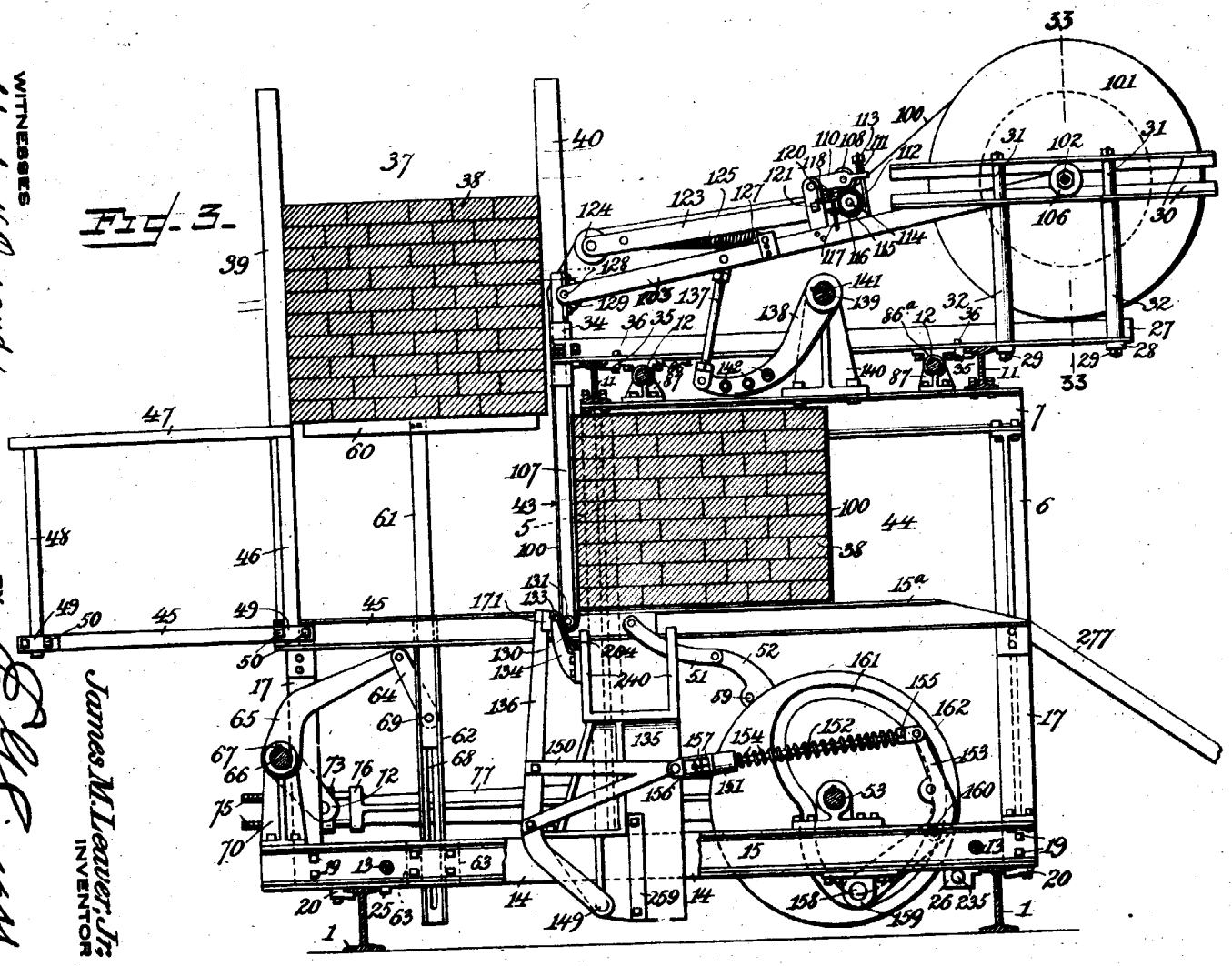
Fig. 3 is a central longitudinal sectional view, illustrating another position of the mechanism, the bundle advancing means being returned to its initial position, and the needle bar being in its lowest position.
Figure 8:
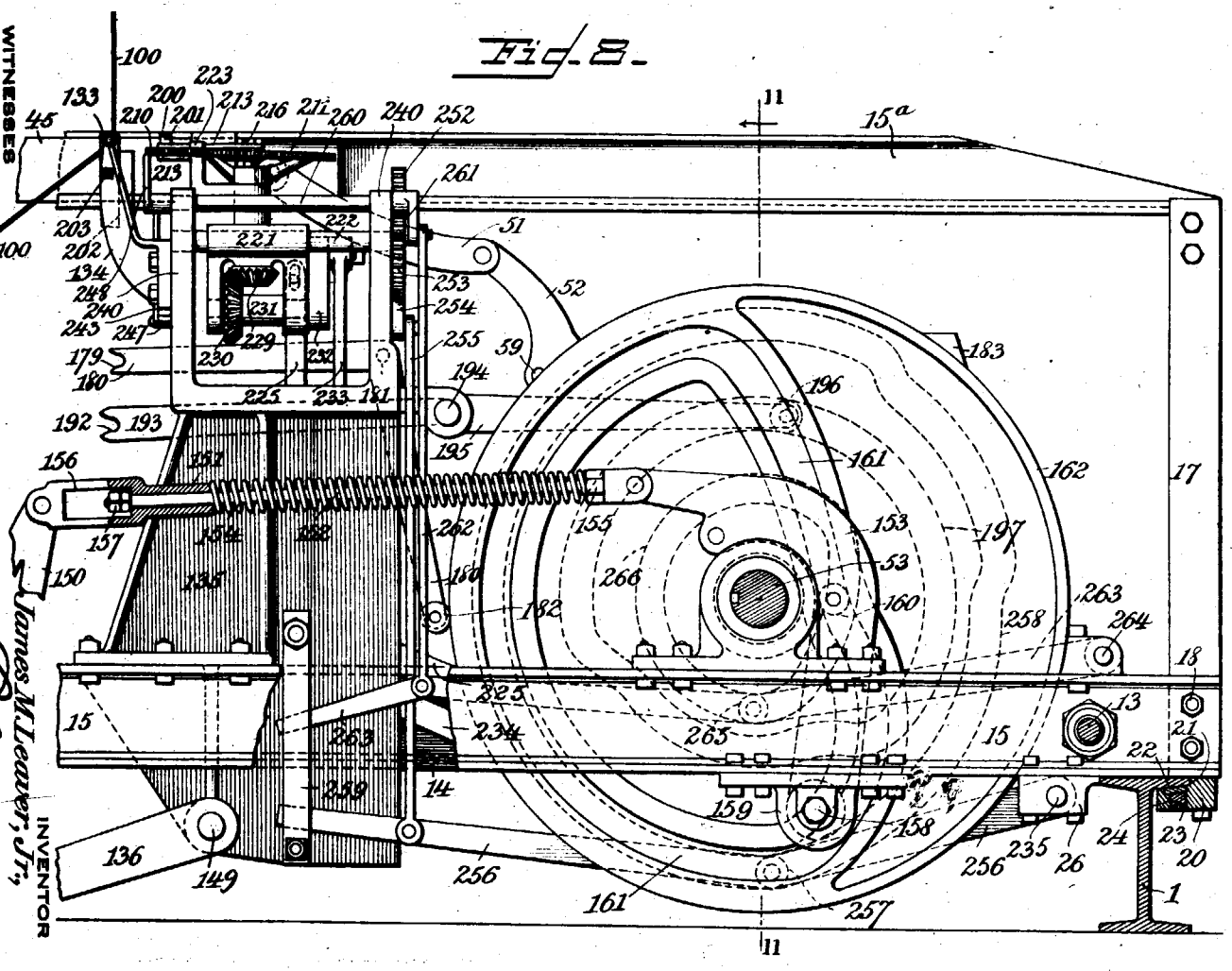
Fig. 8 is an enlarged vertical longitudinal sectional view on the line 8—8 of Fig. 4.
Figure 9:
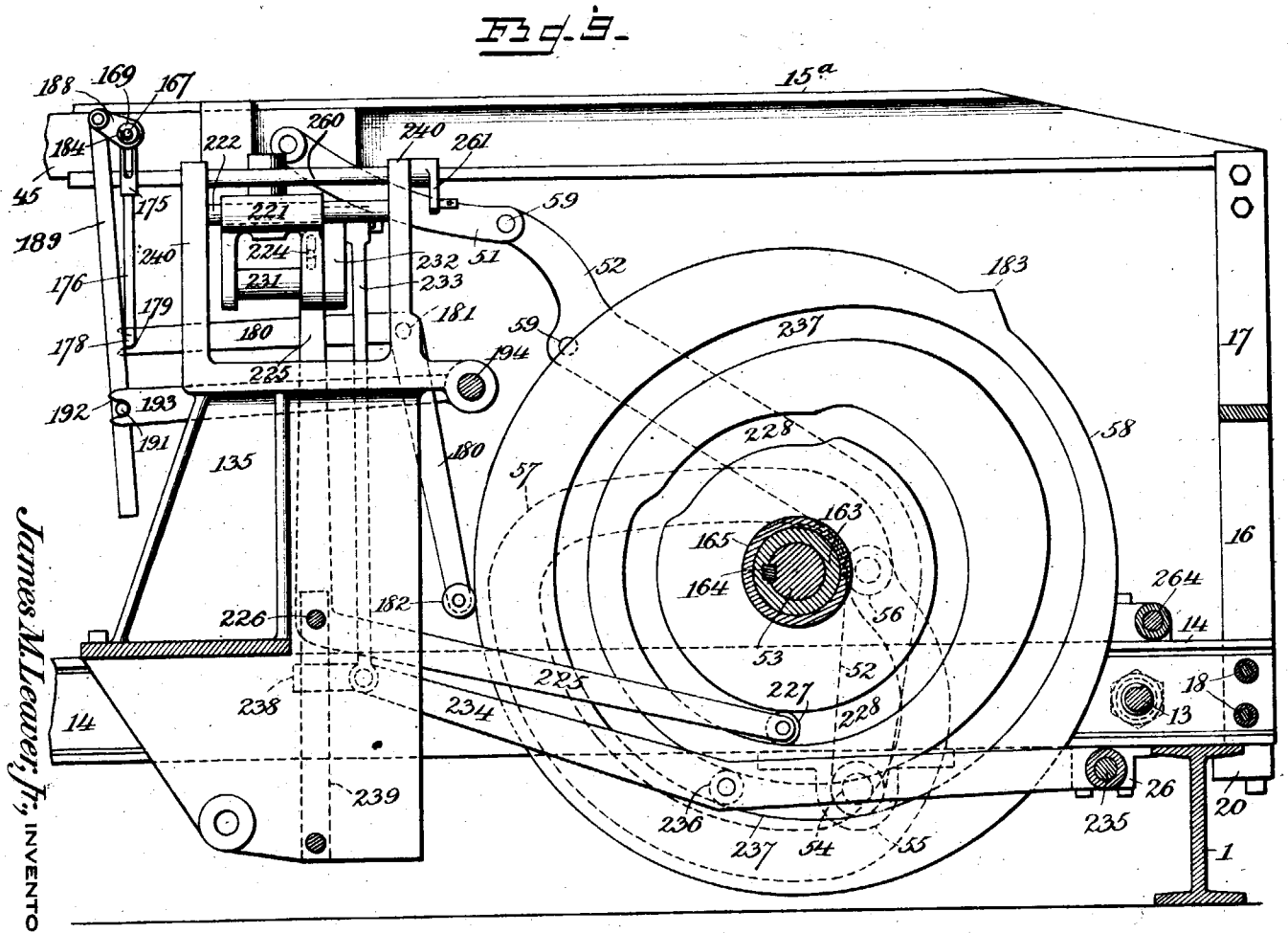
Fig. 9 is a vertical longitudinal sectional view on the line 9—9 of Fig. 7, showing the inner face of one of the main cam wheels.

The longitudinal bars 14 and 15 of the lower auxiliary frame are slidably connected at their front and rear portions with the bottom transverse beams 1 of the main frame by inner stops hereafter described and outer clamps 20, see Figs. 3 and 8, bolted to the bars 14 and 15 at the lower edges thereof and extending across the space between the same. Each clamp is provided with an upper recess 21 to receive the outer upper flange of the contiguous transverse beam 1 and is equipped with an adjustable steel-plate 22, which is forced into engagement with the lower face of said flange by a set screw 23, mounted in a threaded opening 24 in the recessed projecting portion of the clamp 20. The front inner stop 25, which is spaced from and coöperates with the front clamp, consists of a strip secured to the front portions of the channel bars 14 and 15 and extending across the space between the same, and the rear inner stops are preferably formed by spaced transversely alined bearing blocks 26, secured to the bottom flanges of the bars 14 and 15 at the rear portions thereof. When it is desired to adjust the lower auxiliary frame, the clamps are loosened and after the proper adjustment is effected the set screws are tightened to clamp the frame in position.

Each upper adjustable auxiliary frame or support is preferably composed of spaced longitudinally disposed angle bars 27, Figs. 1 to 5, connected at their rear portions by transverse plates or bars 28, which are secured to the horizontal wings or flanges of the angle bars 27 by vertical rods or bolts 29, piercing horizontal flanges of spaced angle bars 30, arranged in pairs at opposite sides of the rear portion of the upper auxiliary frame and forming horizontal guideways. The horizontal flanges of the angle bars 30 are spaced apart by sleeves 31, and the lower angle bars of the guideways are supported by sleeves 32. The sleeves are arranged on the vertical rods or bolts 29. The sleeves 32 are supported upon the horizontal flanges of the side angle bars 27 and are interposed between the same and the lower angle bars of the superimposed guideways, which extend longitudinally of the upper auxiliary frame. The side bars are also connected at their front ends by a transverse plate or bar 33 (see Fig. 5) having a central vertical needle bar guide 34, the plate 33 being bolted to the vertical flanges of the side bars 27.

The upper auxiliary frame is slidably supported by the upper transverse main frame beams 11, fitting against the inner edge of the plate or bar 33 and against one of the transverse plates or bars 28 and engaged by adjustable clamps 35. The clamps 35, which are adjustably secured to the lower faces of the bottom flanges of the side bars 27 of the upper auxiliary frame by screws 36, have recessed engaging portions, which extend beneath the adjacent upper flanges of the transverse beams 11 of the main frame. When the screws 36 are tightened to engage the jaws with the upper transverse beams 11, the upper auxiliary frame is firmly gripped thereon.

Figure 2:
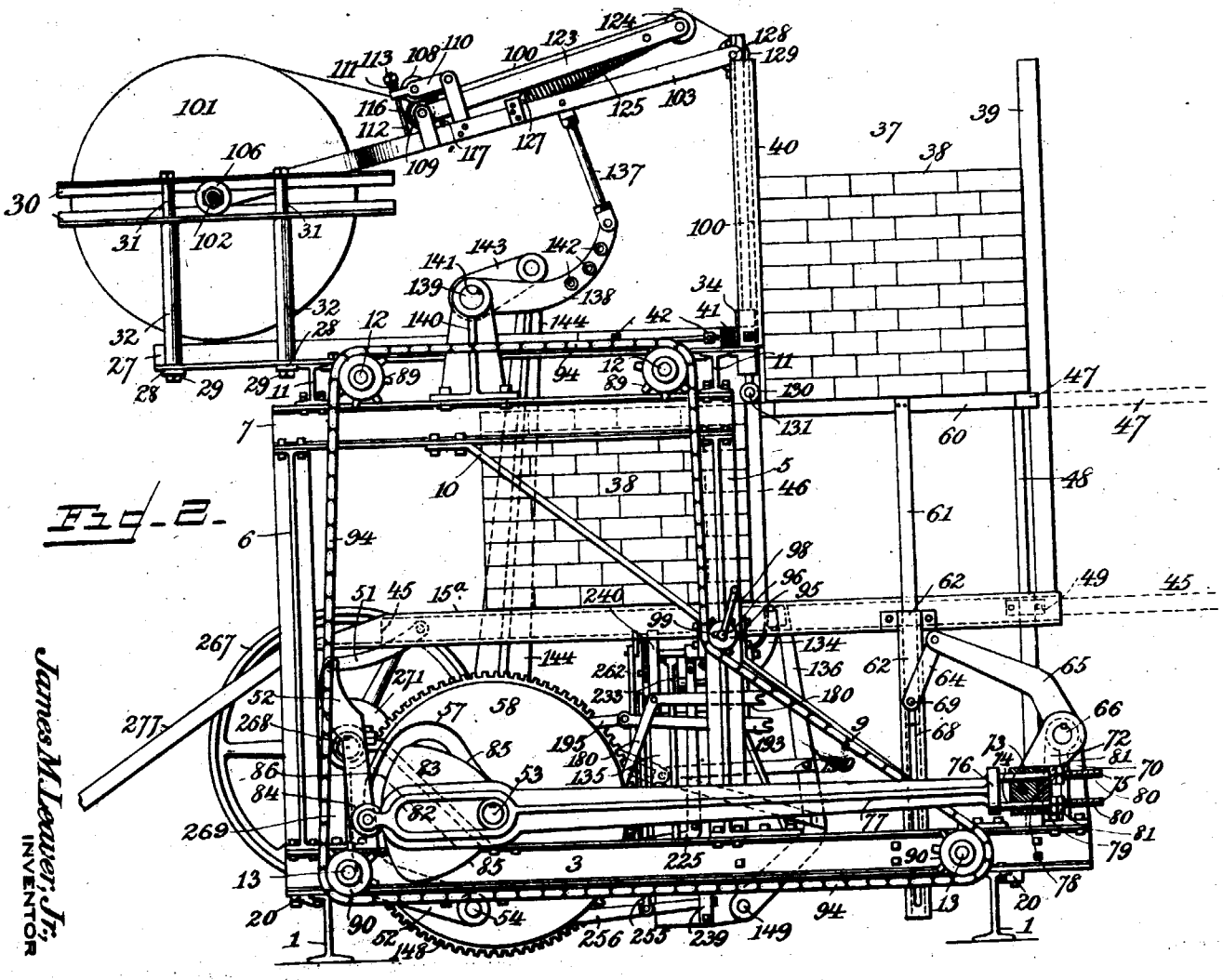
Fig. 2 is a similar view of the opposite side of the machine, showing the material for forming bundles advanced from the lower end of the magazine and partially bound.

The machine is equipped at the front with a vertical magazine 37, adapted to receive a stack 38 of material, which may consist of pieces of lumber, or any other material to be handled in bulk and tied in bundles. The magazine, which may be constructed in any desired manner, is illustrated in the drawings as consisting of outer fixed vertical bars 39 and inner adjustable vertical bars 40, adapted to be moved toward and from the outer fixed vertical bars to vary the size of the magazine. Each set of upper and lower auxiliary frames is equipped with a pair of these magazine-forming bars 39 and 40. The bar 39 is secured at its lower end to the front end of the upper channel bar $15^a$ of the lower auxiliary frame, and the inner adjustable bar 40, which is arranged in the same longitudinal plane as the outer bar 39, is provided at its end with a rearwardly extending horizontal arm 41, which is adjustably secured by bolts 42, or other suitable fastening devices, to one of the angle bars 27 of the upper auxiliary frame (see Fig. 5). As shown in Figs. 1 to 3 inclusive, the inner vertical magazine bars 40 are adjusted to provide a bundle of the maximum width, and they are adapted to be moved forwardly from such position to decrease the width of the bundle. The bars 40 terminate at the side bars 27 of the upper auxiliary frames to form an opening 43 at the lower portion of the inner side of the magazine 37 to permit the lower portion of the stack 38 to be advanced or moved rearwardly from the magazine into a bundle receiving space or chamber 44. The upper longitudinal channel bars $15^a$ of the lower auxiliary frames are spaced apart transversely and constitute a support for the material or bundle; and the bundle, is moved along the channel bars $15^a$ to the position illustrated in Fig. 3 where it is held during the binding thereof.

The bundle forming or moving mechanism, which feeds the material from the bottom of the stack, comprises lower longitudinally slidable horizontal bars 45, inner vertical bundle engaging bars 46, top horizontal stack supporting bars 47, and outer vertical bars 48 extending upwardly from the outer ends of the slidable bars 45 to the outer ends of the stack supporting bars 47. The lower horizontal bar 45, which constitutes a slide, operates in the groove or channel of the channel bar $15^a$, which forms a guide for the said bar 45 and therefore guides the bundle moving means. The vertical bars 46 and 48 are suitably secured at their upper ends to the stack supporting bar 47, and their lower portions are adjustably connected to the slidable bar 45 by clamping plates 49, secured by bolts 50, or other suitable fastening devices to the bar 45 and adapted to clamp the bars 46 and 48 in vertical adjustment. By this construction, the effective length of the bundle forming bar 46 is varied to form a bundle of the desired height, and the stack supporting bar 47 is raised and lowered to arrange it in proper position for supporting the stack left within the magazine during the feeding of the material.

The inner or rear end of the slidable bottom bar of the feeding device is pivoted to the upper end of an inclined connecting link 51, Figs. 1 to 4, 8 and 9, extending downwardly and rearwardly from the slidable bar 45 and pivoted at its lower end to the upper end of a cam actuated lever 52. The cam actuated lever 52 is of angular form and when the feeding device is in its initial position, illustrated in Figs. 1 and 3, the upper portion of the lever 52 is arranged at an inclination and extends downwardly and rearwardly over a main transverse shaft 53 to a point in rear of the same, and when the lever is in such position its lower portion, which is arranged at an obtuse angle to its upper portion, extends downwardly and forwardly to a transverse pivot 54 upon which the lever 52 is mounted. The pivot 54 is arranged in a suitable bearing bracket 55, secured to the channel bar 14 at the lower flange thereof. The angular shape of the lever 52 enables the same to clear the shaft 53 in its backward and forward oscillation. The lever 52 is provided at its angle with a roller 56, Figs. 1, 7 and 9, which is arranged in a cam groove 57 in the outer face of a cam disk or wheel 58, which, when rotated, oscillates the lever 52 to reciprocate the feeding device. At each revolution of the cam disk or wheel, the feeding device is moved inwardly or rearwardly a sufficient distance to carry the material at the bottom of the stack from the magazine into the bundle receiving chamber, and is moved forwardly to return it to its initial position after the bundle has been bound and tied. The cam groove 57 consists of similar opposite actuating portions to swing the lever 52, and an intermediate curved connecting portion arranged concentrically with the pivot of the cam disk or wheel 58 for causing the lever 52 to dwell at the inner limit of its movement while the bundle is being bound and tied. By this mechanism the bundle moving means is held in position against the tension of the wire. The upper portion of the lever 52 is provided with a plurality of perforations 59, adapted to receive the rear pivot of the connecting link 51 to vary the length of the stroke of the feeding device, and while only two perforations 59 are shown in the drawings, any number may, of course, be employed.

In order to relieve the feeding device during its return movement from the weight of the stack, the latter is supported by a vertical movable stack supporting and charging device, which after the feeding device has returned to its initial position, lowers the stack to the bottom of the magazine and thereby arranges a charge of material in position to be operated on by the feeding device for forming the next bundle. Each stack supporting and charging device comprises a top horizontal supporting bar 60, Figs. 1, 2, 3 and 6, and a central vertical slidable bar 61 operating in the groove of a vertical channel bar or post 62, secured at its lower portion to the lower channel bar 14. The vertical channel bar 62 is provided at its lower portion with opposite ears or flanges 63, which are secured to the channel bar 14, and the channel bar 62 is arranged so that the bar 61 is confined in the channel by the bar 14.

The vertically movable stack supporting and charging devices are connected by links 64 with oscillatory arms 65 of a front transverse rock shaft 66, provided with a spline or keyway 67 to receive keys for slidably interlocking the arms 65 with the shaft 66, whereby when the auxiliary frames are adjusted laterally, the arms 65 will be carried with them in their adjustment. The arms 65 extend rearwardly from the rock shaft 66, and the links 64 depend from the rear ends of the arms. The channel bars 62 are provided with vertical slots 68 (Fig. 3) through which pass the lower pivots 69 of the links 64, connecting the links with the vertically slidable bars 61. The front rock shaft 66 extends across the space between the side channel beam 3 and the intermediate longitudinal channel beam 4 (Fig. 5) and is mounted in front bearing brackets 70, bolted to the top flanges of the beams 3 and 4 (Figs. 1, 2, 3 and 5). The rock shaft 66 is provided at its outer end with a depending oscillatory arm 72, pivoted at its lower end to a block 73 having upper and lower openings 74 (Fig. 2) through which pass spaced upper and lower rods 75, extending forwardly from the front end 76 of a substantially horizontal bar or pitman 77. The rods 75, which are arranged in the same longitudinal plane as the pitman 77 constitute an extension thereof and receive an adjustable block or abutment 78, arranged in spaced relation with the front end 76 of the pitman 77 and adapted to be positioned different distances therefrom to permit the pitman 77 to have a limited movement independently of the arms 72 of the rock shaft for controlling the amount of movement imparted to the stack supporting and magazine charging device. The adjustable block 78 is provided with upper and lower openings 79 for the rods 75, and the outer portions thereof are provided with screw threads 80 for the reception of nuts 81, arranged in pairs to form a lock for securing the block 78 in its adjustment.

The pitman 77 is provided at its rear portion with a longitudinal slot 82 through which passes the main shaft 53, forming a guide for the pitman 77 and carrying a cam 83 (Fig. 2) for actuating the same. The rear end of the bar or pitman 77 is equipped with a roller 84, extending inwardly from the pitman and arranged to be engaged by the cam 83. The cam 83, which is fixed to the main shaft 53, tapers inwardly toward the shaft and has similar uniformly curved side edges 85 and a curved outer edge 86, which is concentric with the shaft 53 to cause the pitman 77 to dwell at the end of its inward or rearward movement to maintain the stack supporting and charging device in an elevated position, while the feeding device is being returned to its initial position. One of the curved side edges 85 contacts with the roller 84 and moves the pitman 77 rearwardly, which in its forward movement is actuated by the weight of the material within the magazine. The downward movement of the stack supporting and charging device and the consequent forward movement of the pitman 77 are controlled by the other curved side edge 85 of the cam 83, which in its rotary movement permits the stack to descend gradually to the bottom of the magazine.

Figure 4:
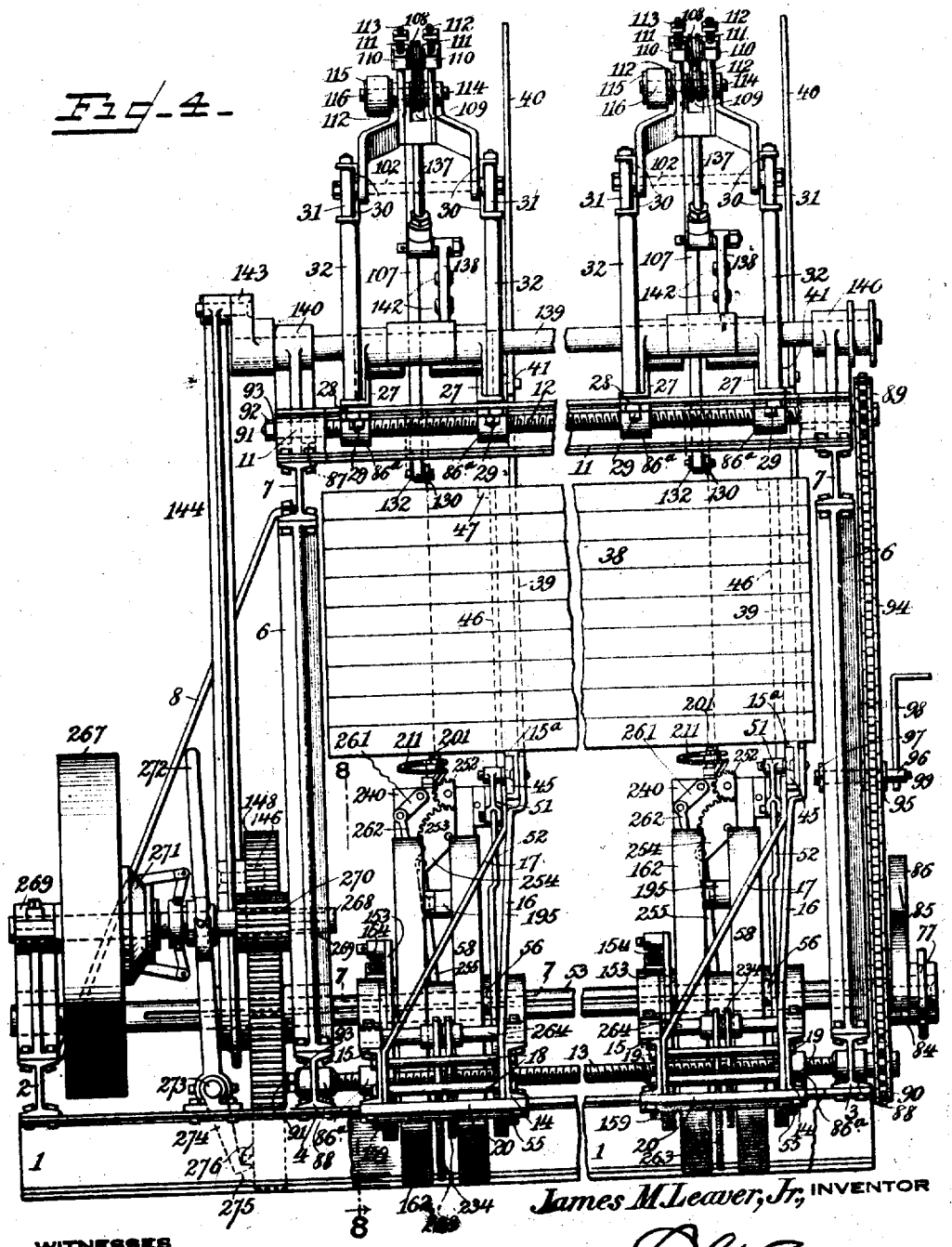
Fig. 4 is a rear elevation of the machine.

The upper and lower right and left hand threaded screws, which adjust the upper and lower auxiliary frames and maintain the same in parallel relation and vary the length of the magazine, engage suitable nuts 86[a], Fig. 4, of the said auxiliary frames and are mounted at their ends in upper bearing brackets 87 and in lower bearings 88. The upper bearing brackets are mounted on the upper longitudinal beams 11 of the main frame, and the lower bearings 88 extend from opposite faces of the webs of the beams 3 and 4. Upper and lower sprocket wheels 89 and 90 (Figs. 2 and 4) are mounted on the outer ends of the screws, which have reduced threaded inner terminals 91 receiving nuts 92 and washers 93, interposed between the adjacent bearings and the nuts. The latter are adjustable to take up any end motion of the right and left hand threaded screws. The upper and lower sprocket wheels, which receive the end thrust at the outer ends of the upper and lower adjusting screws, mesh with and are connected by a sprocket chain 94, which also meshes with a sprocket wheel 95, fixed to a rotary stub shaft 96, mounted in a bearing opening in the outer front column of the main frame of the machine, and provided at its inner end with a collar 97, secured to the inner end of the shaft 96. The sprocket wheel of the front lower screw is located at a point in advance of the front upper sprocket wheel, and the sprocket chain, which extends downwardly from the front upper sprocket wheel, passes beneath the sprocket wheel or pinion 95 and extends downwardly and forwardly at an inclination to the lower front sprocket wheel. The sprocket wheel 95 is arranged at a point intermediate of the ends of the shaft 96 and is located at the outer face of the said column. The shaft 96 is provided at its outer end with a suitable operating device preferably consisting of a crank handle 98, adjustably secured in a transverse opening in the said shaft 96 by a set screw 99. The sprocket gearing is adapted to rotate simultaneously the right and left hand threaded screws, which move the upper and lower auxiliary frames laterally of the machine to space them and the mechanism carried by the frames the desired distance apart to suit the length of the material to be bundled.

The bundles of the material formed by the feeding devices may be bound automatically by the mechanism hereinafter described, or by any other automatic binding and tying mechanism, or they may be bound and tied by hand. In the automatic binding and tying means illustrated in the accompanying drawings, the wire 100 for each adjustable frame is fed from a reel 101, detachably mounted on a rod 102 (Fig. 33) extending across the inner or rear end 104 of a swinging frame 103 and removably connected therewith to enable the reel to be readily placed in and removed from the machine. The swinging frame 103, Figs. 1 to 4 and 12, is composed of spaced side bars, angularly bent at an intermediate point and laterally offset from each other to form the forked rear portion 104 of sufficient width to straddle the wire reel. The front portions of the side bars are connected by bolts having supporting spacing sleeves. The transverse rod 102 extends through and is supported by short transversely alined tubular journals 105 (Fig. 33) screwed into openings in the sides of the forked portion of the swinging frame. Supporting wheels 106 for the reel 101 and frame 103 operate in the guideways 30 of the upper auxiliary frame between the vertical tubes 31, which limit their backward and forward movement. The front end of the swinging frame is pivoted to a vertically movable needle bar 107, which is actuated through the upwardly and downwardly swinging movement of the frame 103, and the backward and forward movement of the swinging frame permits the latter to maintain itself in proper position with relation to the needle bar 107. The needle bar guide 34 holds the needle bar in a vertical position during the oscillation of the frame 103.

Figures 6, 33, 34:
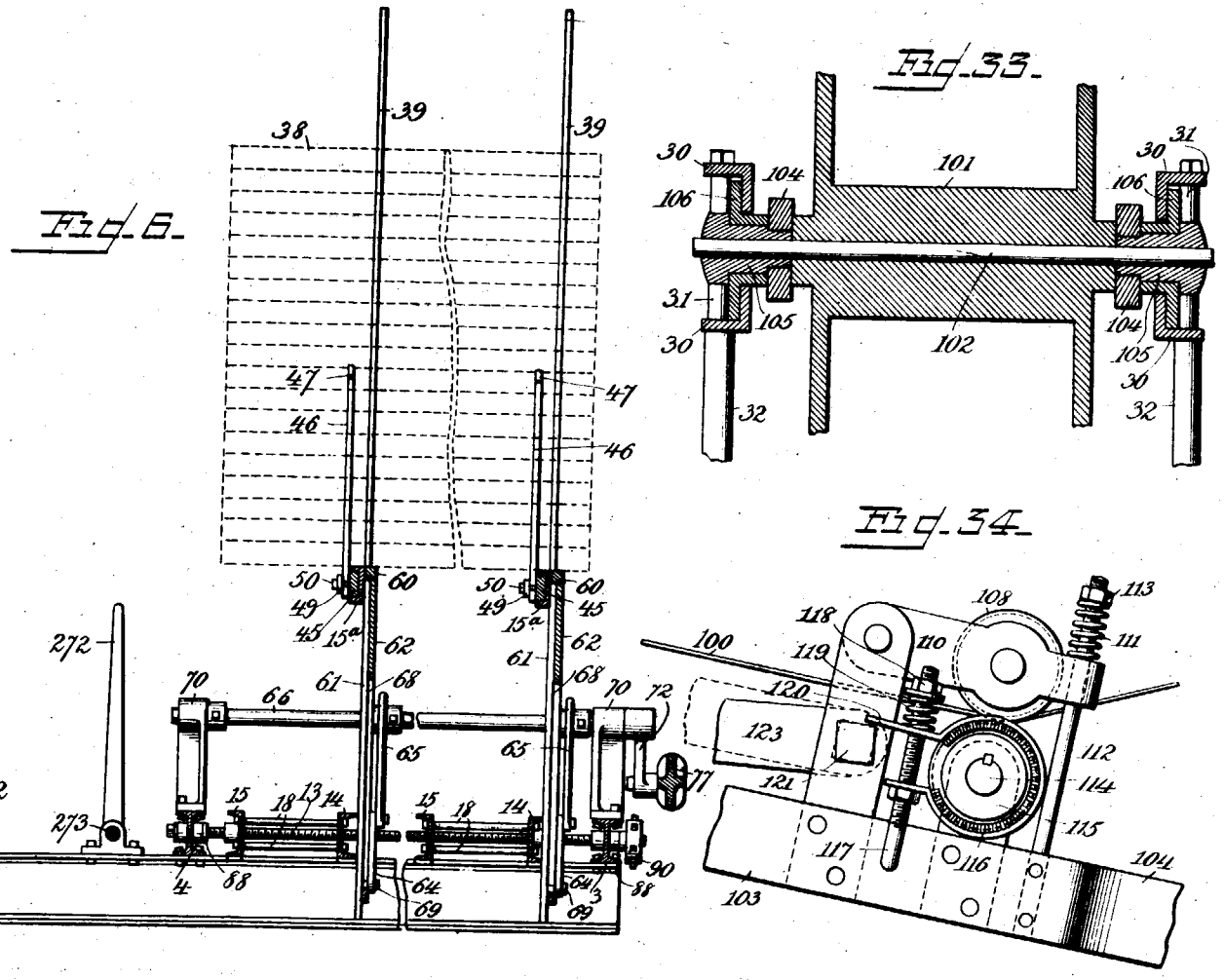
Fig. 6 is a transverse sectional view on the line 6—6 of Fig. 1.
Fig. 33 is a detail vertical sectional view on the line 33—33 of Fig. 3, illustrating the manner of mounting the wire reel.
Fig. 34 is an enlarged side view, illustrating the construction of the tension device and the automatically operable brake.
Figure 7:
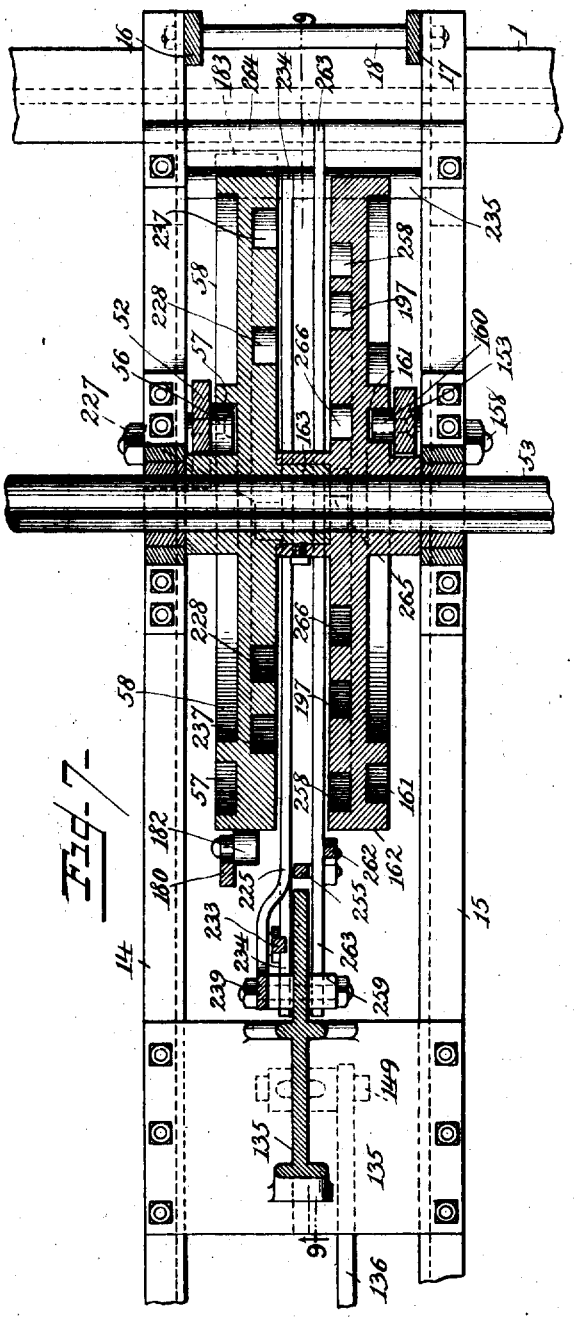
Fig. 7 is an enlarged horizontal sectional view on the line 7—7 of Fig. 4.
Figure 12:
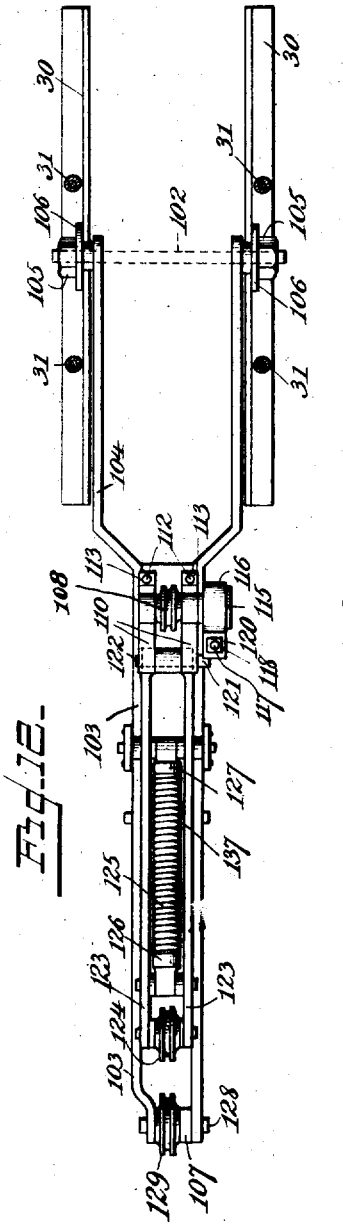
Fig. 12 is a plan view of the swinging frame and the slack take-up lever.

The wire from the reel extends between upper and lower grooved wheels 108 and 109, Fig. 34, of a tension device, which controls the feeding of the wire while the bundle is being bound. The upper grooved wheel is mounted in pivoted arms 110 and is held against the lower grooved wheel 109 by coiled springs 111, arranged on a pair of screws 112, Fig. 12, extending upwardly from the side of the swinging frame at the front of the forked portion thereof and passing through openings in the rear ends of the pivoted arms 110 and having threaded upper portions for the reception of adjusting nuts 113, which engage the springs 111 and control the tension thereof. The lower wheel 109 is mounted on a transverse shaft 114, journaled in suitable bearings of the swinging frame and extending from one side thereof and carrying a brake wheel 115, which coöperates with a brake band 116. The ends of the brake band extend forwardly from the brake wheel and are pierced by a screw 117, fixed to and extending upwardly from the adjacent side of the swinging frame and equipped at its upper end with a nut 118, which engages a coiled spring 119 interposed between the nut and an extension arm 120 of the brake. The nut 118 controls the tension of the spring 119 and enables the brake to be applied with sufficient force to lock the lower grooved wheel 109 and thereby prevent unreeling or feeding of the wire. The arm 120 of the brake projects over the rear portion of the upper face of a squared head 121 of a transverse pivot 122 (see Fig. 12), which connects the rear end of a wire tensioning and take-up arm 123 to the swinging frame.

The wire take-up and tensioning arm 123 is composed of spaced side bars, and is equipped at its front free end with a grooved guide wheel 124 over which the wire passes. The arm 123 extends longitudinally of the front portion of the swinging frame and is adapted to swing upwardly and downwardly with relation to the same to take up any slack in the wire and maintain the same under a constant tension during the binding and tying operation, so that there is no slack or looseness in the band after being tied about the bundle. This arm is urged upwardly away from the swinging frame by a coiled expansible compression spring 125, connected at its ends to front and rear blocks 126 and 127, pivoted, respectively, to the slack take-up arm and the swinging frame.

The pivot 122 of the slack take-up arm 123 is rigid with the arm, and when the arm 123 swings downwardly close to the swinging frame, the rear upper corner of the rectangular head of the pivot engages the extension arm 120 of the brake and lifts the same against the action of the coiled spring 119 and relieves the brake wheel of pressure of the brake band, thus permitting the unreeling or feeding of the wire to be controlled by the tension device. See Fig. 34. When, however, there is any slack in the wire, the arm 123 swings upwardly under the influence of the spring 125 and takes up the slack. This upward swinging movement of the slack take-up arm lowers the rear upper corner of the rectangular head 121 of the pivot 122 and permits the spring 119 to apply the brake and prevent further feeding of the wire until the take-up arm is again swung downward close to the swinging frame to release the brake.

Figures 20, 21:
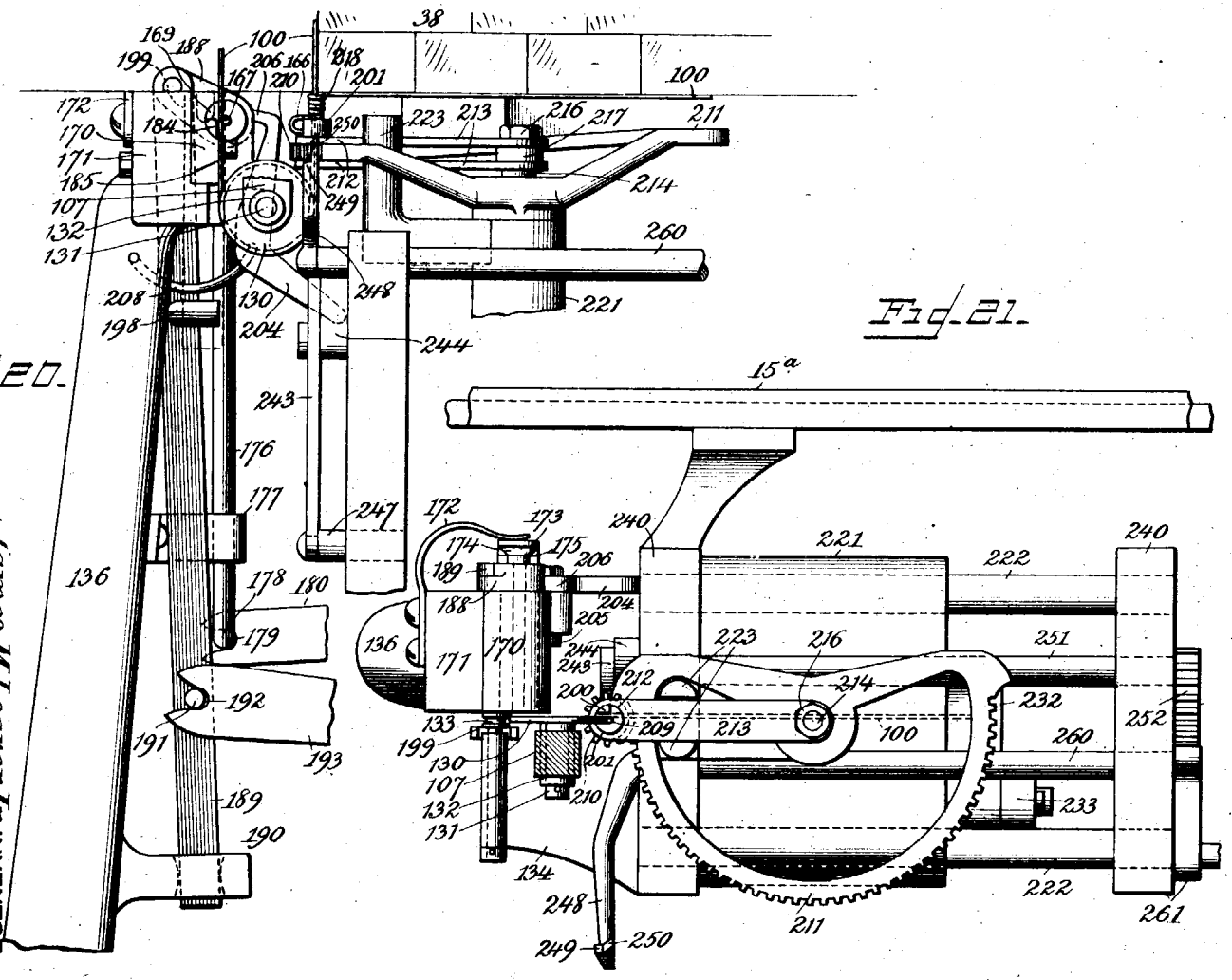
Fig. 20 is a similar view, illustrating the arrangement of the parts at the completion of the coil and prior to the completion of the tying operation.
Fig. 21 is a plan view of the parts shown in Fig. 19.

The pivot 128, which connects the upper end of the needle bar to the front end of the swinging frame, supports an upper grooved guide wheel 129, and the wire extends downwardly therefrom along the needle bar to a lower grooved guide wheel 130, mounted on a shaft 131, which is journaled in a tubular bushing 132, carried by the needle bar. When the feeding mechanism is in its initial position, as illustrated in Fig. 1, the needle bar is at the limit of its upward movement and the stack of material rests upon the bottom of the magazine. When the parts of the machine are in this position the wire extends downwardly from the upper guide wheel 129 past the lower guide wheel 130 to a bottom grooved guide wheel 133, located at the bottom of the magazine and mounted on a fixed bracket 134, secured to and extending upwardly from the front of a housing or support 135 in which the wire coiling mechanism is mounted. The lower portion of the stretch of wire extending between the wheels 129 and 133 is located at the rear opening 43 of the magazine, and when the bundle is advanced into the bundle receiving chamber by the feeding mechanism, the material constituting the bundle engages the said stretch of wire, the vertical portion at the opening 43 fitting against the rear face of the bundle and the wire constituting the the top of the band being drawn from the reel as the bundle advances. Simultaneously with this operation, the wire constituting the bottom of the band is placed against the bundle by a wire extension lever 136 to which the free end of the wire is attached and which swings upwardly with the advancing movement of the bundle. See Figs. 1 and 19. By this arrangement, the wire is laid on the rear, upper and lower faces of the bundle without drawing the wire across the bundle, so that there is no liability of the material of the bundle being cut or otherwise injured in the binding operation thereof. The tension on the wire produces sharp bends at the upper and lower edges of the bundle at the back thereof, so that the wire is placed in a taut condition around the bundle and the bundle is maintained in a tightly bound condition after the wire is knotted or tied. After the bundle has been advanced by the feeding mechanism to the limit of the rearward movement thereof to the position illustrated in Fig. 2, the bundle is held stationary while the wire is placed against the front face of the bundle by the needle bar, which moves downwardly from the position illustrated in Fig. 2 to that shown in Fig. 3. This downward movement of the needle bar produces a sharp bend at the upper edge of the front of the bundle and forms a loop in the wire, the loop being composed of front and rear vertical portions and a bottom connecting bend or portion, which extends around the bottom of the lower grooved guide wheel 130 of the needle bar (Figs. 19, 20 and 27). The inner or rear vertical side of the loop forms the front portion of the band. The needle bar as it moves downwardly intersects the path of the bundle moving means and passes between the bundle supporting elements 15[a].

The swinging frame 103 is connected at a point intermediate of its ends to the upper end of a link 137 (Fig. 1), which is pivoted at its lower end to an arm 138 of a top transverse rock shaft 139, journaled in suitable bearings 140 (Fig. 5) and provided with a spline or keyway 141, for slidably interlocking the arms 138 with the upper transverse rock shaft 139. The arm 138, which is curved upwardly and forwardly from the rock shaft, is provided at intervals with perforations 142 to permit an adjustment of the swinging frame for arranging the same at different elevations to position the needle bar properly to correspond to any adjustment of the magazine and to suit the size of the bundle formed by the feeding mechanism. It will be readily understood that no adjustment is necessary on the arm 138 in order that the wire binding of different dimensioned bundles should take place; it is merely desirable. The reason for the adjustment is to assure a more positive bend at the upper rear corner of the bundle and to prevent the possible buckling up of the shook, which consists of two or more pieces in width, by laying the wire more closely to the top of the bundle. The bearings 140 are mounted on the upper longitudinal beams of the main frame of the machine. The top rock shaft is provided at one end with an arm 143, which is connected to the upper end of an upright actuating bar or pitman 144, provided at its lower portion with a slot 145 through which passes the main shaft 53.

The upright pitman is provided adjacent to the upper end of its slot 145 with a roller 146, which operates in a cam groove 147 in the outer face of a gear wheel 148. The cam groove is composed of inwardly converging side portions and a connecting outer portion which is arranged concentric with the main transverse shaft and located adjacent to the rim of the gear wheel. The converging side portions of the cam groove 147 extend inwardly from the ends of the peripheral concentric portions to a point slightly beyond the center of the gear wheel, and they actuate the upright bar or pitman in the upward and downward movements thereof. The concentric connecting portion of the cam groove permits the upright bar or pitman 144 to dwell at the limit of its upward movement, as clearly illustrated in Fig. 1, while the bundle is being advanced by the feeding mechanism from the magazine to the bundle receiving chamber.

The wire extension lever 136, which is angular, is disposed longitudinally of the machine when it is at the limit of its downward movement, as illustrated in Fig. 1, is pivoted at its rear end 149 to a depending web or portion of the housing or support 135, and is adapted to swing upwardly therefrom to an upright position, as illustrated in Figs. 2 and 3. It is provided at an intermediate point in advance of its angle with an approximately V-shaped arm 150, extending upwardly from the lever when the latter is at the limit of its downward movement and pivotally connected at its upper end to a sleeve 151 of a connecting rod 152. The rod 152 is equipped with tension means and extends rearwardly from the arm of the wire extension lever, being pivoted at its rear end to a cam actuated lever 153. A coiled spring 154 is arranged on the connecting rod 152 and is interposed between a rear nut 155 and the inner or rear end of the sleeve 151. This spring constitutes a yieldable means for connecting the wire extension lever with its actuating means. The front portion of the connecting rod extends through the sleeve, which is provided with a longitudinal slot or opening 156 receiving nuts 157 engaging screw threads of the front end of the connecting rod and arranged to abut against the end walls of the slot or opening for limiting the relative slidable movement of the sleeve and the connecting rod. Two nuts 157 are preferably employed to form a lock. The coiled spring 154 urges the sleeve forwardly or outwardly, and is adapted to compensate for any variation in the cam movements and enables a full tension on the wire to be maintained at all times. The cam actuated lever 153, which is approximately L-shaped, is mounted at its lower end on a transverse pivot 158, and is adapted to swing backwardly and forwardly. When at the limit of its forward movement, it extends upwardly from a point below and slightly in rear of the main transverse shaft 53 and then forwardly over the same, as clearly illustrated in Fig. 8. The pivot 158 is mounted in a bracket 159, which is secured to the channel bar 15 of the auxiliary frame.

Figure 5:
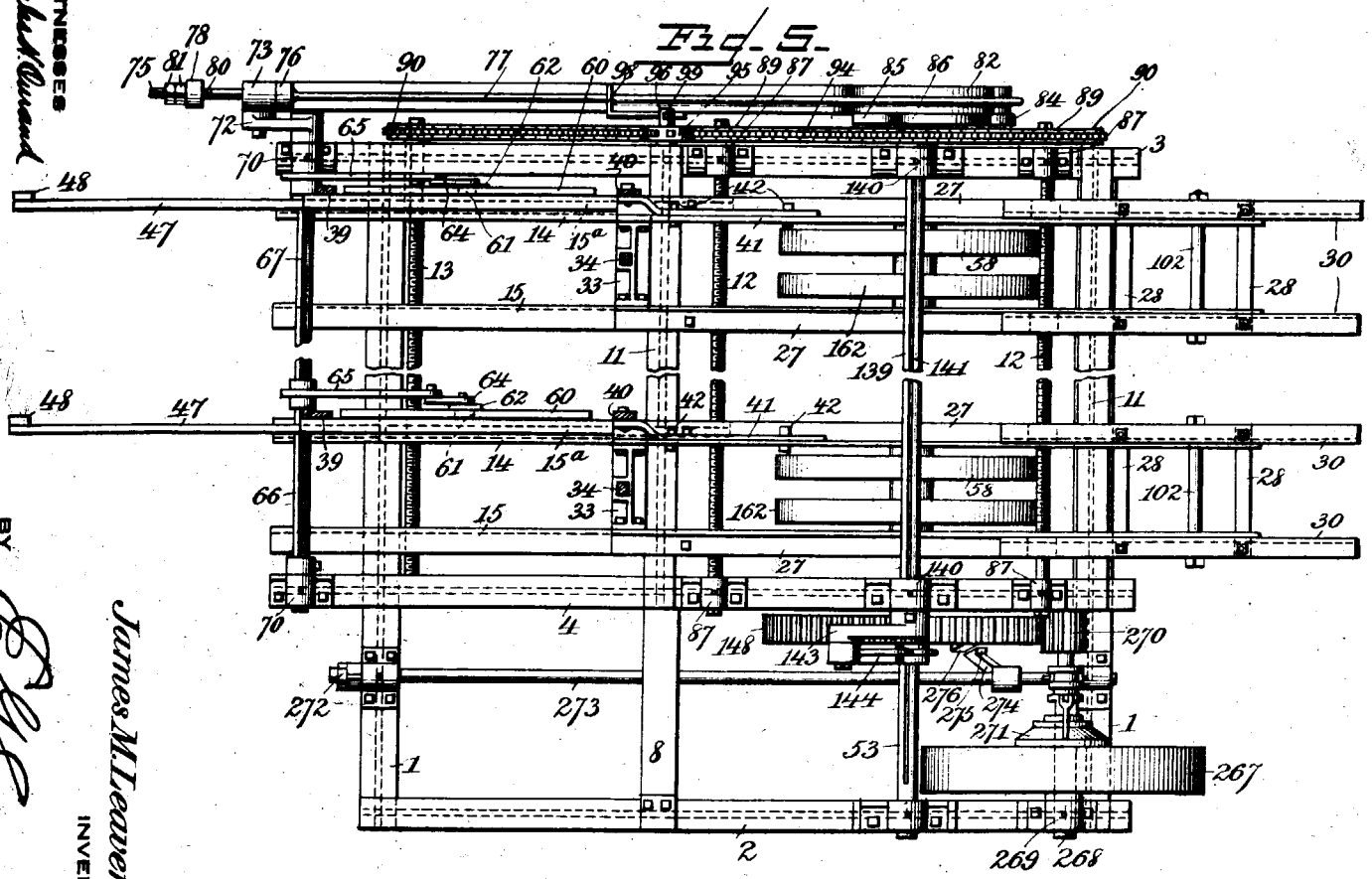
Fig. 5 is a plan view of the machine, parts being removed.

The lever 153 is provided at an intermediate point with a roller 160, which is arranged in a cam groove 161 in the outer face of a cam disk or wheel 162. The cam groove is composed of a curved outer peripheral portion and a transverse connecting portion extending across the central portion of the outer face of the cam disk and having opposite grooved portions adapted to actuate the wire extension lever and swing the same upwardly and downwardly. The curved peripheral portion maintains the wire extension lever in its upright position adjacent to the support or housing 135 while the wire is being knotted or tied. Each lower auxiliary frame carries one cam disk 58 and one cam disk 162 (Fig. 5). The cam wheel 58 is provided with an extended hub or sleeve 163, Figs. 7 and 9, having a key 164 to engage the groove and slidably interlock the cam wheel 58 with the main transverse shaft, and the hub 165 of the other cam 162 is fixed to the sleeve or hub 163, the two cams 58 and 162 being thus maintained in fixed relation.

When the wire extension lever swings downwardly and forwardly, the end 166 of the wire is looped as shown in Fig. 27 around a projecting terminal portion of a pin 167 slidably mounted in a central opening 168 of a cylinder 169, constituting a rotary wire looping or bending device. See Figs. 13 to 21. The cylinder is journaled in a bearing opening in a block or piece 170, which is secured to a head 171 formed integrally with the outer end of the wire extension lever 136. The pin is maintained in a projecting position by an approximately L-shaped spring 172, secured at one end to the outer face of the head 171 of the lever 136 and extending around one side of the latter with its free end bearing against a head 173. The latter is formed on the rear end of the slidable pin and is provided with a beveled inner edge or face 174, arranged to be engaged by a slidable wedge 175. The wedge 175, which is slotted or bifurcated to straddle the rear portion of the slidable pin, is formed integrally with a rod 176, which is guided in an opening of an arm or guide 177 (Figs. 19 and 23), mounted on and projecting from the outer portion of the wire extension lever and arranged in spaced relation with the head thereof. When the wedge is moved upwardly, the slidable pin is moved inwardly and its projecting terminal portion withdrawn from the looped end 166. When the wedge is moved downwardly, the pin is automatically returned to its projecting position by the spring 172.

The rod 176 is provided at its lower end with a laterally projecting arm 178, which is carried by the wire extension lever into and out of a recess 179 in the front terminal of a forwardly extending arm of a bell crank lever 180, fulcrumed at its angle on the support or housing 135 by a suitable pivot 181. See Figs. 8, 9 and 10. The other arm of the lever 180 extends downwardly and rearwardly and is provided at its lower end with a roller 182, arranged to run on the periphery of the cam wheel 58, which is there provided with a tapered projecting cam 183 of approximately triangular shape. When the cam 183 engages the roller of the bell crank lever 180, it lifts the forward extending arm of said lever 180 and moves the wedge 175 upwardly and withdraws the projecting end of the pin from the looped end 166 of the wire.

The end of the wire is looped around or bent against the projecting terminal of the pin 167 by a lug 184, projecting from the end of the cylinder and arranged at the periphery thereof in spaced relation with the projecting end of the pin and tapered, as shown in Figs. 27, 29 and 30, to coöperate with a cutter 185 to shear off the wire at the lower end of the outer vertical portion of the loop formed by the needle bar. The cutter 185, which consists of a straight piece, is arranged at an angle to the cylinder 169, as shown in Fig. 15, and it is adjustably mounted in an opening 186 of the block or piece 170 by a set screw 187, and its outer end is tapered or beveled to form a cutting edge to coöperate with the lug 184. When the cylinder is rotated, the lug 184 is carried across the cutting edge of the cutter and the wire is severed. The end of the outer vertical portion of the wire is carried around the projecting end of the pin 167 by the lug 184 (Fig. 27) to form the looped end or portion 166, which secures the free end of the wire to the wire extension lever. The projecting pin is maintained in engagement with the looped terminal of the wire during the forward and return movements of the wire extension lever.

The cylindrical body of the rotary wire looper is provided at its rear end with an arm 188 (Figs. 13 and 16), pivoted to the upper end of a bar 189 (Fig. 20), extending longitudinally of the outer portion of the wire extension lever and slidably mounted at its inner end in an opening of an arm or guide 190, extending at an angle to the wire extension lever and preferably formed integrally therewith. The connecting bar 189 is provided at a point intermediate of its ends with a laterally projecting pivot 191, which is carried into a recess 192 of an oscillatory arm 193 by the upward movement of the wire extension lever. See Figs. 2, 8, 9, 10 and 19. The arm 193 extends forwardly from a transverse pivot 194, mounted in a suitable bearing at the rear face of the housing or support 135 and carrying a rearwardly extending arm 195. The arms 193 and 195 are rigidly connected by the transverse pivot 194 and constitute a lever for moving the bar 189 upwardly and downwardly to oscillate the arm 188 and partially rotate the cylinder 169. The arm 195 is provided at its rear end with a roller 196, which operates in a cam groove 197 in the inner side face of the cam wheel 162.

The cam groove 197 consists of a relatively long curved portion extending around the main transverse shaft in spaced relation thereto and concentric therewith, and a transverse connecting portion arranged to oscillate the arm 195. One side of the transverse connecting portion of the groove moves the bar 189 upwardly, Figs. 19, 20 and 23, and carries an arm 198 into engagement with a spring lever 199 for causing the same to press the outer vertical side of the needle bar formed loop into the space between the projecting terminal of the pin 167 and the lug 184, which occurs after the horizontal terminal has been caught by an upwardly projecting lug 200 of a rotary coiler 201 (Fig. 28) and after the loop 166 of the horizontal terminal has been released (see Figs. 19, 23 and 26). The other side of the transverse connecting portion of the cam groove 197 moves the bar 189 downwardly and actuates the cylinder to sever the wire and form the looped terminal. The central part of the transverse connecting portion of the cam groove is also concentric with the main shaft, thus bringing about a pause between the upward and downward movements of the bar 189. When the roller 196 is in the main concentric portion of the cam groove the bar 189 is in the lower position.

The arm 198 is secured at one end to the connecting bar 189, and it is arranged in an approximately horizontal position when the wire extension lever is in an upright position, as illustrated in Fig. 23, and it is provided at its outer end with a horizontal angularly disposed portion for engaging the spring lever 199. The spring lever 199, which is composed of an upper plate or piece and a lower resilient portion or spring 202, is fulcrumed on the bracket 134 by a horizontal bolt 203, which extends through the central portion of the lever 199. The lower resilient portion 202 of the lever 199 is bowed, as shown, and when the arm 198 moves upwardly, the said resilient portion 202 is compressed against the bracket 134, thereby swinging the upper portion of the lever outwardly and forwardly to carry the wire into the channel or space of the rotary looping device. The spring lever 199 is returned to and maintained in its initial position by an approximately U-shaped spring 199[a], secured at one end to the bracket 134 and connected at its other end to the upper portion of the spring lever.

The rotary looping device is locked against rotary movement, when the wire extension lever is swung downwardly and until the same returns to the housing or casing 135, by means of an angular lever 204, Figs. 13 to 21, pivoted at an intermediate point by a bolt 205 to the block or piece 170 and composed of two arms arranged at an obtuse angle to each other, the upper arm being approximately vertical, and the lower arm being inclined when the wire extension lever is in an upright position. The upper arm is provided at its terminal with an engaged tooth 206, which is moved automatically into engagement with a recess 207 of the rotary cylinder by a spring 208, when the wire extension lever swings downwardly away from the support or housing 135. The spring 208, which is curved, is secured at one end to the wire extension lever and is connected at its other end to the inner arm of the locking lever 204. When the wire extension lever swings upwardly, the inclined arm projects rearwardly and is carried into engagement with the support or housing 135, whereby the tooth of the other arm is swung out of engagement with the rotary cylinder. As the locking lever 204 is carried away from the support or housing 135, the spring reengages it with the rotary looping cylinder.

The coiling device is moved backwardly and forwardly to carry it into and out of its wire engaging position, and in its tying position is located substantially at the lower edge of the bundle, which position is of primary importance inasmuch as it makes it possible to bind bundles of any dimension. It consists of a vertical cylindrical portion having a longitudinal wire receiving slot 209 and provided at the bottom with spur teeth 210, forming a pinion and meshing with an actuating gear 211. The pinion has a slot matching the slot of the coiler as Fig. 25 shows. The slot 209, which extends inwardly from the periphery to the center of the rotary wire coiler, receives the lower end of the inner vertical portion of the needle formed loop, which inner vertical portion constitutes the front portion of the band (Fig. 19). When the rotary wire coiling device is in its engaging position, the vertical wire, which passes through the slot 209, is arranged centrally thereof and the horizontal terminal of the band extends across the top of the rotary coiling device, while the lug 200 is located at one side of the slot 209, as clearly illustrated in Fig. 26.

The rotary coiling device is mounted in vertically alined bearing openings 212 in the front ends of a pair of spaced upper and lower horizontal plates 213, secured at their inner or rear ends to a vertical stem 214. The lower end of the cylindrical body of the rotary coiling device projects below the teeth 210 thereof and forms a journal, which is arranged in the opening of the lower plate 213. The upper end of the stem 214, Fig. 22, is reduced to form a supporting shoulder 215 and is threaded for the reception of a nut 216, which secures the horizontal plates to the stem, a spacing disk 217 being interposed between the inner or rear ends of the horizontal supporting plates 213.

The wire coiling device moves downwardly to follow the lead of the coil 218, and for this purpose the vertical stem 214 is guided in a vertical socket or opening 219 of a vertical shaft 220 to the upper end of which the gear 211 is keyed or otherwise secured. The coiling device, when coiling one end of a tying wire around a section thereof, operates to begin the coiling by forming the first coil against the bundle and continuing the coiling operation and receding from the bundle as the subsequent coils are made. The vertical shaft 220 is journaled in a suitable bearing of a slidable carrier 221 movable backwardly and forwardly to carry the rotary coiling device to and from its operative position and guided by a pair of spaced longitudinally disposed horizontal rods 222, arranged at the upper portion of the housing or support 135 and supported by the same. The horizontal plates 213 are guided at an intermediate point by a vertical guide 223, composed of spaced vertical sides formed integrally with and extending upwardly from the front portion of the slidable carrier as shown in Figs. 19, 20 and 21.

The carrier 221 consists of a horizontal body portion having a central vertical extension and provided with spaced depending front and rear portions. The central body portion is provided at opposite sides of the center with longitudinal openings, which receive the guide rods 222, and the shaft 220 is arranged in a central vertical bearing opening, which extends through the central extension of the carrier. The inner or rear depending portion of the carrier is connected by a pivot 224 to one arm of a bell crank lever 225, Figs. 9, 10, 19 and 22, fulcrumed at its angle on the casing or housing 135 by a bolt 226, and having a lower rearwardly extending arm provided with a roller 227, which operates in a cam groove 228 in the inner face of the cam wheel 58. The cam groove 228, Fig. 9, consists of a relatively large concentric portion and a transverse connecting portion, which actuates the roller to move the carrier backwardly and forwardly.

The gear 211, which is approximately semi-circular, has a toothed peripheral portion arranged spirally at a slight inclination and adapted when rotated to conform to the vertical movement of the wire coiling device without its teeth getting out of mesh with the pinion 210. Fixed to the lower end of the vertical shaft 220 is a horizontal pinion 229, which meshes with a vertical beveled gear 230, mounted on a short horizontal rock shaft 231, which is journaled in the depending portions of the carrier. The beveled gearing, which connects the vertical and horizontal shafts 220 and 231 of the slidable carrier, is arranged in the space between the said depending portions, and the rock shaft is provided at its inner or rear end with a crank arm 232, which is connected by a bar 233, Fig. 9, to a cam actuated lever 234, extending longitudinally of the machine and mounted at its rear end on a transverse pivot 235, which is arranged in the spaced bearing blocks 26 (Fig. 3). The cam actuated lever 234 is provided at an intermediate point with a roller 236, which operates in a cam groove 237 in the inner side face of the cam wheel 58. The lower end of the connecting rod 233 is pivoted to the cam actuated lever 234 adjacent to the front end thereof, and the front end portion 238 (Fig. 10) of the lever 234 is arranged in an approximately horizontal position and is guided between a central depending web of the support or housing 135 and a vertical bar 239, which is secured to the said web at one of the side faces thereof. The lever 234 is swung upwardly and downwardly by the cam wheel 58 and motion is imparted to the rock shaft for actuating the gearing to rotate the gear wheel 211 and the coiling device in mesh with the same. The support or housing 135 is bolted or otherwise secured to the lower longitudinal channel bars of the lower auxiliary frame, and the upper portion 240 of said support or housing is approximately U-shaped, being composed of a horizontal bottom portion and front and rear sides extending upwardly from the bottom portion and receiving the slidable carrier between them.

The cam, which actuates the wire coiling device, imparts a slight initial movement to the same to bend the horizontal terminal portion of the wire at 241 (see Fig. 28) to prevent the same from slipping through the coiling device when the terminal loop 166 is released by the rotary looping device, and as soon as the horizontal terminal portion of the wire is caught by the twisting device and is released by the rotary looping device, the outer vertical portion of the needle bar formed loop of the wire is pressed into the channel or space between the projecting pin and the lug of the rotary looping device by the spring lever 199. The bottom horizontal portion of the band is locked around the front vertical portion in tight frictional engagement and in coiling the horizontal wire around the inner vertical wire, the coiling device is carried slightly beyond the position in which it is withdrawn from the wire and a slight retrograde rotation is imparted to it in order to free it from the wires and to enable it to be readily withdrawn from them when the slidable carrier is moved rearwardly. The cam grove 237, which actuates the lever 234, is shaped to impart these movements to the wire coiling device.

At the completion of the coil 218 and prior to the severing and tucking of the outer vertical portion of the wire, the inner vertical portion is given a slight bend 242 at the lower end of the coil 218 to prevent the vertical wire section from slipping through the same. This bend 242 is made in the wire by a wire tying or tucking lever 243 while the lower guide wheel of the needle bar is still in its lowermost position. As soon as the bend 242 is made, the needle bar moves upwardly and the wire is cut, the lower terminal portion of the front vertical wire of the band being carried upwardly by the wire tying lever 243, Figs. 24, 25, 29, 30 and 31, to tuck the said lower end of the front vertical wire between the band and the bundle at a point above the coil, which is also bent upwardly against the bundle by the wire tying lever to arrange the coil out of the way and thereby prevent it from being injured in the handling of the bundle. The wire tying lever, which is approximately L-shaped, consists of a long upright arm and a short upper approximately horizontal arm, and it is pivotally connected at a point intermediate of its ends to a crank arm 244, with its lower end guided in a vertical slot 245 in the support or housing 135. The short horizontal arm of the wire tying lever is provided with a grooved head 246, and the lower end of the lever is provided with a projection 247, which extends into the vertical guiding slot 245. The crank arm 244 depends in a substantially vertical position when the wire tying lever is in its initial position, and in the wire tying operating it makes one half of a revolution carrying the wire tying lever upwardly and moving the wire engaging head 246 thereof through the curved path indicated by the dotted circles *a*, *b*, *c*, *d*, *e*, *f* and *g* in Fig. 24 of the drawings. This upward movement of the lever lifts the wire and carries the same from the position shown in Fig. 24 to the tied position shown in Fig. 25.

In order to enable the wire tying lever to pass readily between the band and the bundle, the front vertical portion of the band is forced outwardly from the bundle by a substantially L-shaped finger 248, consisting of a straight inner portion and a slightly curved outer portion provided at the outer end with a shoulder 249 and having a tapered or wedge-shaped terminal portion 250. The band engaging finger is swung upwardly from the position illustrated in full lines in Fig. 24 of the drawings to the position shown in Fig. 25, and the wedge-shaped terminal portion is inserted between the band and the bundle, the wedge forcing the band outwardly from the bundle to provide a space for the uncoiled end of the band, and the shoulder 249 bearing against the band and forming a stop or abutment for the same and preventing the band from being carried in the direction of movement of the wire tying lever by the latter. Thus the end of the vertical portion of the wire is positively tucked between the band and the bundle. The wire tying lever and the band engaging finger are movable to a position in overlapping relation, as clearly illustrated in Fig. 25, so that the uncoiled band is securely fastened under the front vertical portion of the same where it will be firmly held by the tension of the band when the oscillatory finger is withdrawn.

The crank arm 244 is fixed to the front end of the horizontal crank shaft 251, journaled in bearings of the upper portion of the support or housing 135 and extending longitudinally of the same, and provided at its rear end with a pinion 252, Figs. 8, 11, 19 and 21, having an arm or extension 254, piercing a crank pin to which is connected the upper end of a rod 255, which is connected at its lower end to a longitudinally disposed cam actuated lever 256, extending longitudinally of the machine and mounted at its rear end on the pivot 235, which also supports the rear end of the cam actuated lever 234. The lever 256 is provided intermediate of its ends with a roller 257, see Fig. 10, which operates in a cam groove 258, formed in the inner face of the cam wheel 162. The connecting rod 255, which is approximately vertical, is pivoted at the lower end of the lever 256 at a point near the front end thereof and the front end of the said lever 256 is guided between the central vertical web of the support or housing and a vertical bar 259 (Fig. 8), secured to one of the side faces of the web of the support or housing in spaced relation with the same by the fastening devices, which also secure the guide bar 239. The same cam groove 258 of the cam wheel 162 is shaped to impart to the gear and the crank actuated wire tying lever the movements heretofore described.

Figure 10:
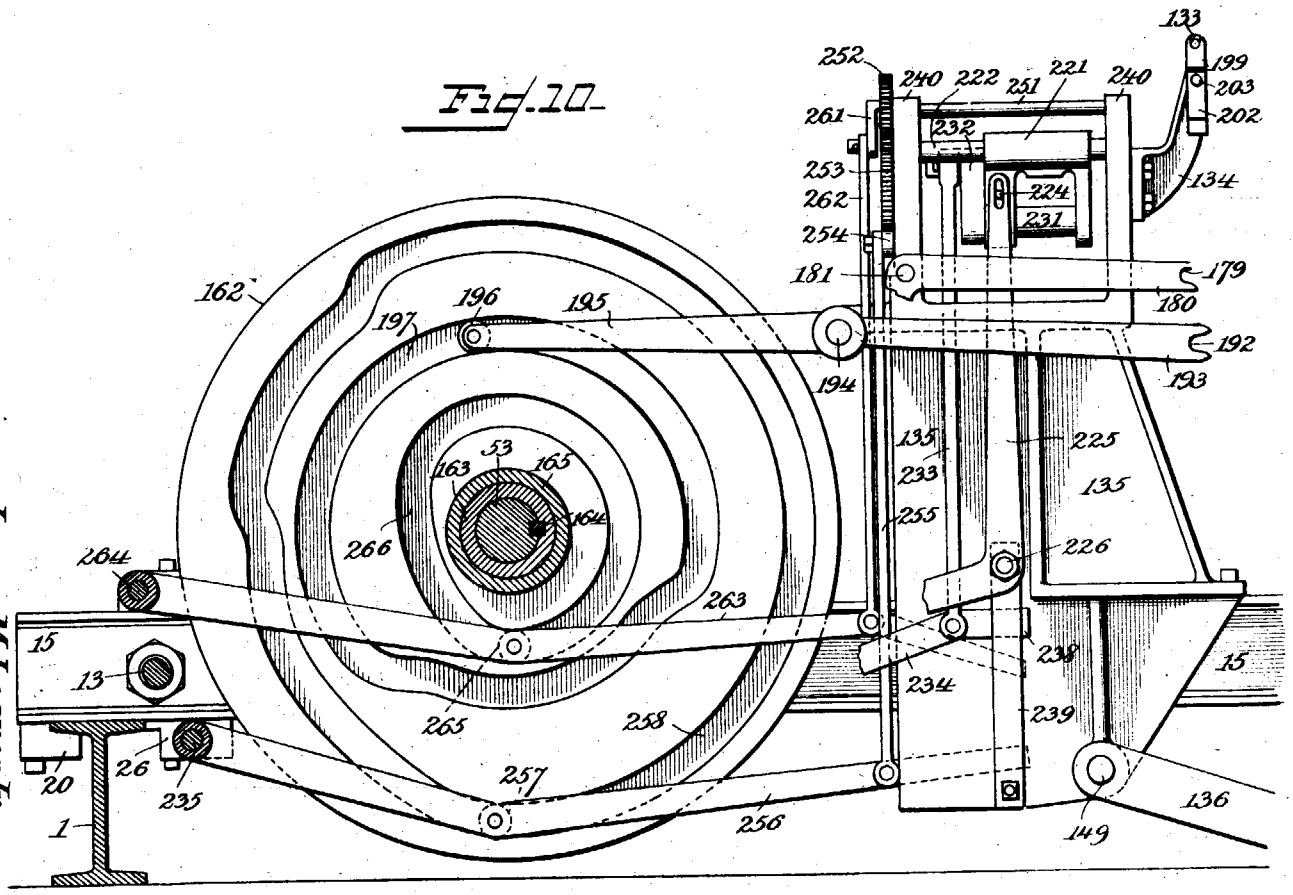
Fig. 10 is a similar view, taken on the same line as Fig. 9 but looking in the opposite direction and showing the inner face of the other main cam wheel
Figure 17:
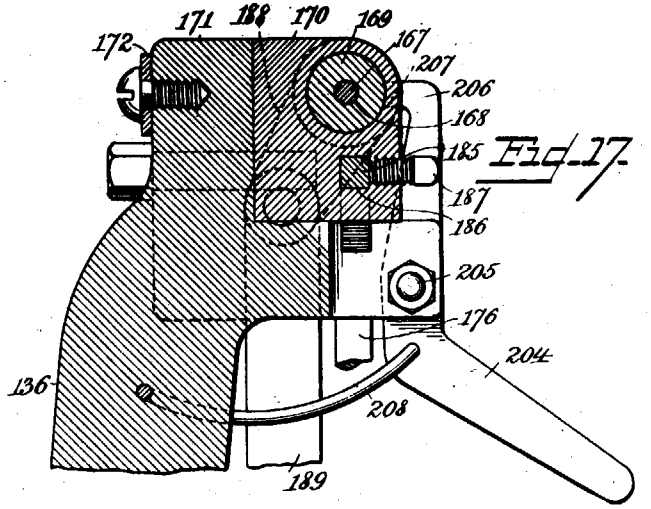
Fig. 17 is a vertical sectional view corresponding to Fig. 13.
Figure 18:
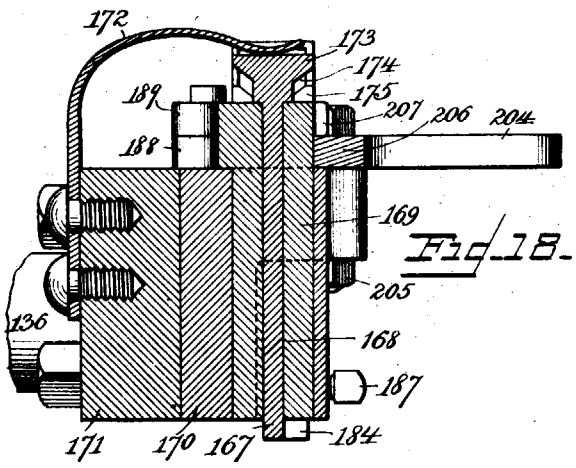
Fig. 18 is a horizontal sectional view corresponding to Fig. 14.
Figure 11:
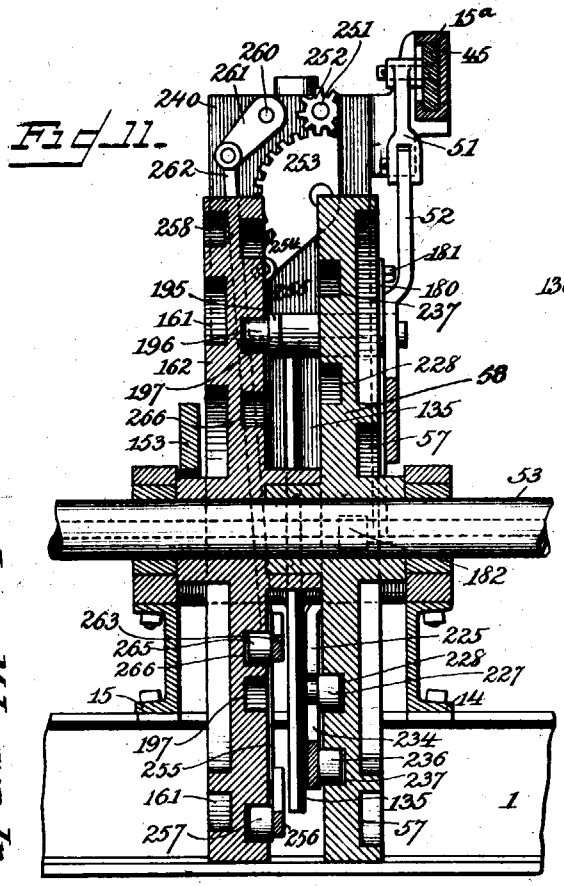
Fig. 11 is an enlarged transverse sectional view on the line 11—11 of Fig. 8.

The band engaging finger 248 is mounted on the front end of a crank shaft 260, Fig. 10, journaled in suitable bearings of the support of housing 135 and arranged horizontally in spaced relation with the crank shaft 251 and in parallelism with the same and provided at its rear end with a crank 261. The parallel longitudinal shafts 251 and 260 are arranged at opposite sides of the central upwardly extending bearing portion of the carrier, which is grooved at opposite sides to receive the said horizontal shafts 251 and 260, as clearly illustrated in Fig. 22. The crank 261 is connected by a substantially vertical connecting rod 262 with the front end of a longitudinally disposed cam actuated lever 263, mounted at its rear end on a suitable pivot 264, and provided at an intermediate point with a roller 265, which operates in a cam groove 266 in the inner side face of the cam wheel 162. The pivot 264 is mounted in suitable bearings and the lower end of the connecting rod 262 is pivoted to the lever 263 near the front end thereof, the front end of the said lever 263 being guided in the space between the central vertical web of the casing or housing and the said guide bar 259.

The machine may be driven by any suitable power, which is connected by ~~a belt~~ with a pulley 267 (Fig. 4), loosely mounted on a transverse driving shaft 268 journaled in suitable bearings 269 of the main frame and carrying a pinion 270, which meshes with the gear wheel 148. The bearings 269 are preferably mounted on the longitudinal beams 2 and 4 of the main frame, and the pulley 267 is connected with the driving shaft by a clutch 271, which may be of any preferred construction. The clutch 271 is connected with a handle or lever 272 fixed to a longitudinal shaft 273 from which depends an arm 274 having a projecting point 275, which is carried into the path of a lug 276 of the gear 148, when the pulley is clutched to the driving shaft. The lug 276 is tapered to present a beveled engaging face, which is adapted to contact with the projecting point 275 of the arm 274 to throw the clutch automatically out of engagement with the driving wheel to stop the machine after the bundle has been tied. The depending arm 274 is detachably secured to the shaft by a set screw or other suitable means, and it may be moved out of the path of the lug and the handle or lever may be secured in position for holding clutch in engagement with the pulley of the driving shaft when a continuous operation of the machine is desired. The shaft 273, which extends longitudinally of the machine, is journaled in suitable bearings, of the frame, and the operating handle or lever is fixed to the front of the shaft and is located at the front end of the machine.

When the machine is continuously operated, the bound bundle is automatically ejected from the machine at the back of the bundle receiving space or chamber.

The mechanism for forming and feeding bundles herein shown and described is claimed *per se* in a patent dated March 19, 1918, No. 1,260,003, and is claimed in this application only in so far as it coöperates or is combined with the binding and tying mechanism herein shown and described. In this specification, in order to avoid confusion, one of the binding and tying mechanisms only has been specifically described, but as was pointed out above, there are two or more of these mechanisms which are operated simultaneously, the wires of which are simultaneously bent around the bundles, as the latter are forced into the bundle receiving chamber. By utilizing a plurality of these bundle tying mechanisms the work can be more quickly and better done.

I claim:

1. In a machine for binding bundles of incompressible material, the combination with a main frame having a bundle support, of an upper auxiliary frame supported at the top of the main frame and carrying a needle bar, and a lower auxiliary frame disposed below the top of the main frame and carrying knotting mechanism which is located substantially at the lower edge of the bundle when in binding position.

2. In a machine for binding bundles of incompressible material, the combination with a main frame having a bundle support, of means for supporting a needle bar element above the top of said frame, means for supporting the knotting mechanism below the top of said frame and substantially at the lower edge of the bundle when in binding position.

3. In a machine for binding bundles of incompressible material, the combination with a main frame having a bundle support composed of longitudinal elements spaced apart transversely, of means for supporting a needle bar above the top of said frame, means for moving said needle bar downwardly through the space between said elements, and means for supporting the knotting mechanism below the top of said frame in the path of the needle bar and near the lower edge of the bundle when in binding position.

4. In a machine for binding bundles of incompressible material, the combination with a main frame having a bundle support composed of longitudinal elements spaced apart transversely, means for moving a bundle on said support, of means for supporting a needle bar above the top of said frame, means for moving said needle bar downwardly through the space between said elements and in the path of movement of said bundle moving means, and means for supporting the knotting mechanism below the top of said frame in the path of the needle bar and near the lower edge of the bundle when in binding position.

5. The combination with a main frame, of a plurality of laterally adjustable upper and lower auxiliary frames, mechanism for forming bundles, placing bands around the bundles and tying the ends of the bands carried by said auxiliary frames, and means for simultaneously moving said auxiliary frames toward and from each other.

6. In a machine for binding bundles of incompressible material, a frame including a support for the bundle, means for binding the bundle while on the support, and means for moving the bundle along said support into binding position and holding said bundle while being bound, said bundle moving means being guided by said bundle support.

7. In a machine of the character described, the combination of a bundle forming mechanism having a stationary upright frame, of a plurality of wire tying mechanisms carried by and located within said frame, means for adjusting said wire tying mechanisms toward and from each other, and means for actuating said mechanisms.

8. In a machine of the character described, the combination with a bundle forming mechanism having a fixed upright frame, of a plurality of movable wire tying mechanisms in the form of individual units carried by and located within said frame above the bundle to be tied, and means for adjusting the positions of said wire tying mechanisms toward and from each other, so as to place the desired number of wire bands around the bundle at desired intervals.

9. In a machine of the character described, the combination with an upright stationary frame and a bundle forming mechanism mounted thereon and including a bundle-receiving chamber support, of a plurality of movable wire tying mechanisms carried by said frame below said chamber or support, means for actuating said wire tying mechanisms, and means for moving said wire tying mechanisms toward and from each other independently of said frame, so as to adjust the positions of the same and place the desired number of wire bands around the bundles at desired intervals.

10. In a machine of the character described, the combination of a bundle forming mechanism having a fixed upright frame, of a plurality of movable wire tying mechanisms, including wire reels, in the form of individual units carried by and located within said frame above the bundle to be tied, and means for simultaneously moving said wire tying mechanisms toward and from each other thereby adjusting the positions of the same so as to place the desired number of wire bands around the bundle at desired intervals.

11. In a machine of the character described, means for feeding wire across the path of movement of a bundle forwardly and rearwardly of the same when moved, means for moving the bundle to bring said wire into loop formation about said bundle, and means for uniting the stretches of the wire at the point of meeting of the same.

12. In a machine of the character described, means for feeding wire across the path of movement of a bundle of material forward and rearward of the same when moved, means for moving the material to bring said wire into loop formation about said material, means for uniting the stretches of the wire at the point of meeting of the same, and means for severing the wire beyond the point of uniting of its stretches together.

13. In a machine for binding bundles of incompressible material, upper and lower frames spaced apart forming a bundle receiving chamber therebetween, a reel mounted upon the upper frame, means upon the lower frame member for holding the free end of a wire, said wire being held under tension between the frame members, means for shoving a bundle against said wire and into the chamber whereby a band is wrapped about the three sides of the bundle, means for moving a strand of wire in front of said bundle completing the band, means for tying the band, and means for severing the wire.

14. In a mechanism of the character described, upper and lower frames spaced apart forming a bundle receiving chamber therebetween, reels mounted upon the upper of said frames, means for extending wire from said reels down in front of said bundle receiving chamber, means upon the lower frame member for holding the free ends of said wire, tensioning devices upon the upper frame for holding the wires taut, means for shoving a bundle against said wires into said bundle receiving chamber, whereby bands of wire are wrapped about the top, bottom and back of said bundle, means for moving down strands of wire in front of said bundle completing the bands, means for tying each of said bands to the bundle, and means for severing the wires.

15. In a machine for binding bundles of incompressible material, spaced apart frame members forming a chamber or passageway therebetween, means for extending a wire across the front of said chamber, a tension device for the wire, means for catching hold the free end of the wire, means for causing relative movement of the wire and bundle whereby the bundle is inclosed on three sides, means for laying the wire against the fourth side, and means for tying said wire.

16. In a machine of the class described, a frame, means mounted on the frame for guiding a wire, means on the frame for catching hold the free end of the wire, said wire guiding means being supported above the wire end holding means whereby a substantially vertical strand of wire is presented to the bundle, means for pushing a bundle against said wire whereby the bundle is inclosed by wire on the top, bottom and back, means for inclosing the front of said bundle with said wire, and means for tying said wire.

17. In a machine of the class described, spaced apart frame members forming a chamber therebetween, means mounted on one frame member for extending a wire therefrom to the other frame member across the front of said chamber, means upon the other frame member for holding the free end of the wire, means for pushing a bundle against said wire into said chamber whereby the bundle is inclosed by wire on the top, bottom and back, means for inclosing the front of said bundle with said wire, and means for tying said wire around the bundle.

18. In a mechanism of the character described, means for feeding wire, means for holding the free end of the wire to present a substantially vertically extending strand thereof between the feeding means and the holding means, means for pushing a bundle against said substantially vertically extending strand causing said wire to inclose the top, bottom and back of said bundle forming a band, means for moving a section of the wire down in front of said bundle, and means for tying said band.

19. In a machine for binding bundles of incompressible material including, in combination, means for moving the bundle into binding position on the machine, a binder carrying device, means operated after the completion of movement of the bundle to actuate said binder carrying device to carry the binder across the path of the bundle in rear thereof, said bundle moving means remaining in fixed relation to the bundle and resisting the tension of the wire during the tying operation.

20. In a machine for binding bundles of incompressible material including, in combination, means for moving the bundle into binding position on the machine, a binder carrying device, means operated after the completion of movement of the bundle to actuate said binder carrying device to carry the binder across the path of the bundle in rear thereof, said bundle moving means remaining in fixed relation to the bundle and resisting the tension of the wire during the tying operation, and means for returning the binder carrying device to its initial position and for moving the bundle moving means out of binding position.

21. In a machine for binding bundles of incompressible material, spaced apart frame members, means mounted on one frame member for extending a wire substantially vertically to the other frame member, means on the other frame member for holding the free end of the wire, means for pushing a bundle sidewise against said wire whereby the bundle is inclosed on three sides, means for laying the wire against the other face of the bundle, and means for tying said wire at the point of closure.

22. In a machine for binding bundles of incompressible material, means for holding a wire in position to be engaged by a bundle with a portion of the wire held substantially vertically across the path of the bundle, means for pushing the bundle against the wire to cause the encompassing of three sides of the bundle, means for moving the wire across the fourth side of the bundle, means for tying the wire, and means for tensioning the wire during the entire operation.

23. In a machine for binding bundles of incompressible material, means for holding a wire in position to be engaged by a bundle with a section of the wire held substantially vertically and another section held in an inclined position, means for pushing the bundle against a portion of the vertical section whereby two sides of the bundle are wrapped, means for bringing the inclined section of the wire against the third side of the bundle, means for extending the wire across the fourth side, wire knotting means, and wire tensioning means.

24. In a machine for binding bundles of incompressible material, means for holding a wire in position to be engaged by a bundle with a section of the wire held substantially vertically and another section held in an inclined position, means for pushing the bundle against the substantially vertical section whereby two sides of the bundle are wrapped, means for bringing the inclined section against the third side of the bundle simultaneously with the advance of the bundle against the wire whereby the wire is not drawn across any of the faces of the bundle, means for extending the wire across the fourth side, wire knotting means, and wire tensioning means.

25. In a machine for binding bundles of incompressible material, means for drawing out a sufficient amount of wire before the binding of the bundle begins to permit enveloping the bundle, means for tensioning the wire as it is drawn out, and applied means for moving the bundle to cause the taut wire to be laid on the bundle, and means for tying the tensioned wire.

26. In a machine for binding bundles of incompressible material, means for drawing out a sufficient amount of wire before the binding of the bundle begins to permit enveloping the bundle, means for moving the bundle so as to cause the wire to be laid about three sides of the bundle without drawing the wire across any of the faces of the bundle, means for extending the wire along the remaining side of the bundle, means for tying the wire, and means for keeping the working length of the wire under tension during the entire operation.

27. In a machine for binding bundles of incompressible material, the combination with means for first drawing out a sufficient amount of wire before a bundle is bound to permit enveloping the bundle, means for moving the bundle so as to cause the wire to be laid across three sides of the bundle without drawing the wire across any of the faces of the bundle, means for extending the wire along the remaining side of the bundle, means for tying the wire, means for keeping the working length of the wire under tension during the entire operation.

28. In a machine for binding bundles of incompressible material, a support for the bundle to be bound, wire guiding means movable from an upper position to a lower and back again, wire drawing means movable from a lower position to an upper and back again, and means for bringing the wire drawing means and the wire guiding means together at approximately a corner of the bundle.

29. In a machine for binding bundles of incompressible material, a support for the bundle to be bound, wire guiding means movable from an upper position to a lower and back again, wire drawing means movable from a lower position to an upper and back again, wire tying means movable with respect to the bundle, and means for bringing the wire drawing means, the wire guiding means and the wire tying means together at approximately a corner of the bundle.

30. In a machine for binding bundles of incompressible material, a support for the bundle to be bound, wire guiding means movable from an upper position to a lower position and back again, wire drawing means movable from a lower position to an upper position and back again, and means for moving the wire drawing means from the lower to the upper position, then moving the wire guiding means from the upper to the lower position, and then moving the wire drawing means from the upper to the lower position.

31. In a machine for binding bundles of incompressible material, means for causing relative movement of a bundle and of a strand of wire whereby the wire is laid around three sides of the bundle, means for moving the wire about the fourth side, means for uniting the ends of the wire and means for severing the wire.

32. In a machine for binding bundles of incompressible material, means for causing relative movement of a bundle and of a strand of wire whereby the wire is wrapped about three sides of the bundle, means for laying the wire against the fourth side, means for maintaining the wire under substantially constant tension during said wrapping, means for uniting the ends of the wire and means for severing the wire.

33. In a machine for binding bundles of incompressible material, the combination of means for causing relative movement of a bundle and of a strand of wire whereby the wire is wrapped about three sides of the bundle, means for laying the wire against the fourth side, means for reciprocating the wire laying means, means for maintaining the wire under substantially constant tension during said wrapping, means for uniting the ends of the wire, means for severing the wire and reëngaging the wire for the next bundle.

34. In a machine for binding bundles of incompressible material, a frame including a support for the bundle, means for moving the bundle along said support, wire knotting means, wire severing means, means for engaging the free end of the wire after each severing operation to draw predetermined lengths thereof outwardly to cover substantially one face of the bundle, a tension device for the wire, and guiding means for the drawn-out section of the wire.

35. In a machine for binding bundles of incompressible material, spaced apart upper and lower frame members, wire extension means mounted on one frame member for engaging with and holding the free end of the wire, said wire extension means being adapted to draw the wire outwardly, means for actuating the wire extension means, means for tensioning the wire, means for directing the tensioned wire about a bundle, and means for uniting one end of the wire with a section thereof.

36. A machine for binding bundles of incompressible material including bundle supporting means, a wire extension lever pivotally mounted below the supporting means and holding the end of a wire, means for advancing a bundle along said supporting means against the held wire, means for rocking the wire extension lever synchronously with the advance of the bundle and in the same direction to lay the wire upon the under side of the bundle, and means for completing the binding of the bundle.

37. A machine of the class described including unitary means for cutting the wire and for bending one end thereof, and means for engaging the bent end of the wire and for drawing the latter outwardly.

38. A machine of the class described including means for cutting the wire and for bending one end thereof, means for engaging the bent end of the wire and for drawing the latter outwardly, and means for releasing the wire.

39. A machine for binding bundles of incompressible material including a wire extension lever for drawing out a predetermined length of wire, said lever carrying means for both cutting a wire and for catching hold of one of the cut wire ends preparatory to drawing the wire outwardly.

40. A machine of the class described including a frame, a wire engaging lever mounted on the frame, an oscillatory wire extension lever movable toward and from the first-mentioned lever, means mounted on the wire extension lever for bending the wire, and mechanism carried by the wire extension lever for operating the wire bending means and for engaging the first-mentioned lever to cause the same to move the wire into engagement with the said bending means.

41. A machine for binding bundles of incompressible material including a wire extension lever, means on the lever for holding the free end of a wire, and a knotting mechanism toward which the wire end is moved by the lever, said knotting mechanism moving independently of the lever in juxtaposition to the wire holding end.

42. A machine of the class described including means for cutting a wire and for bending one end thereof, means for engaging the bent end of the wire for drawing the latter outwardly, a coiling device movable toward and from the bent end of the wire and provided with means for engaging and wrapping the same around another portion of the wire, and means for operating the coiling device.

43. A machine of the class described including means for cutting a wire and for bending one end thereof, an element carrying the latter means, means for moving the element backwardly and forwardly to draw the wire outwardly, and a coiling device movable toward and from the said element and provided with means for engaging and coiling the bent end of the wire.

44. In a machine for binding bundles of incompressible material, a frame including a support for the bundle, means for moving the bundle along said support into binding position, said support comprising substantially parallel beams extending in the direction of the feed of the bundle, said beams being adjustable transversely of the feed of the bundle, and said bundle moving means being guided by said bundle support and holding the bundle during the binding thereof.

45. A machine for binding bundles of incompressible material including an oscillatory wire extension lever, means for positively driving said lever in each direction and means mounted on one end of the lever for bending the end of the wire preparatory to drawing the wire outwardly.

46. A machine for binding bundles of incompressible material including a wire extension lever, means for positively driving said lever in each direction, means on the lever for bending the end of the wire, and means for locking the bending means to hold the wire end to the lever by means of said bend.

47. A machine for binding bundles of incompressible material including an oscillatory wire extension lever, means for positively driving said lever in each direction, and means mounted on the lever for cutting a wire and also for bending and securing the free end of the wire after cutting.

48. A machine of the class described including an oscillatory wire extension lever, means for positively driving said lever in each direction, means mounted on the lever for bending the end of the wire, means also carried by the lever for engaging the end of the wire when the same is bent, and means for releasing the wire.

49. A machine of the class described including an oscillatory wire extension lever, means for positively driving said lever in each direction, means carried by the lever for cutting the wire and bending one end thereof, and means also carried by the lever for engaging the bent end of the wire to enable the latter to be drawn outwardly by the lever.

50. A machine for binding bundles of incompressible material including wire-guiding means, a positively driven element movable toward and from the wire-guiding means for drawing the wire outwardly, means mounted on said element for bending the end of the wire, and means also carried by said element for coöperating with the bending means to secure the end of the wire after the same has been bent.

51. A machine for binding bundles of incompressible material including a pivotally mounted wire extension lever, a wire tensioning device, said lever carrying means for holding the end of a wire and being adapted to draw the latter outwardly under tension, and means for actuating the wire extension lever.

52. A machine of the class described including a pivotally mounted wire extension lever provided with means for holding the end of the wire and adapted to draw the latter outwardly, a second lever, a cam for moving the second lever and yieldable means for connecting the cam actuated lever with the wire extension lever.

53. A machine of the character described, including wire extension means having means for holding the end of the wire and adapted for drawing the wire outwardly, means for actuating the wire extension means, and yieldable means for connecting the actuating means with the wire extension means.

54. A machine for binding bundles of incompressible material including a wire extension lever, means for moving the same, a bending device mounted on said lever, a knotting mechanism toward which the lever moves to present the bending device in juxtaposition to the knotting means, and means for locking the bending device except when in juxtaposition.

55. A machine of the class described including a frame, an oscillatory wire extension lever, means for operating said lever, a movable wire engaging device mounted on the lever, mechanism carried by the lever for actuating the wire engaging device to draw the same from engagement with the wire, an actuating lever mounted on the frame and arranged in the path of and adapted to engage with the said mechanism, and means mounted on the frame for oscillating the actuating lever.

56. A machine of the class described including a frame, a wire extension lever, means for operating said lever, a wire engaging device movably mounted on the wire extension lever, mechanism carried by the wire extension lever for actuating the wire engaging device to withdraw the same from engagement with the wire, an actuating lever mounted on the frame and arranged in the path of and adapted to engage with the mechanism of the wire extension lever, a cam mounted on the frame and arranged to engage the actuating lever, and means for operating the cam.

57. A machine of the class described including a frame, an oscillatory wire extension lever, means for operating the same, a wire engaging device movably mounted on the lever, means carried by the lever for bending the wire around the said device, mechanism mounted on the lever for withdrawing the said device from the bend of the wire, and actuating means mounted on the frame and arranged in the path of and adapted to engage the mechanism of the lever for operating the same.

58. A machine of the class described including a frame, a wire extension lever, means for operating the same, a wire engaging device carried by the said lever, a bending device arranged to bend the wire around the said engaging device, mechanism mounted on the lever for actuating the bending device, and means mounted on the frame and arranged in the path of the said mechanism and adapted to engage with and actuate the same.

59. A machine of the class described including a frame, an oscillatory wire extension lever, means for operating the same, a wire engaging device carried by the same, a rotary bending device arranged to bend the wire around the said engaging device, a bar mounted on the lever and connected with the bending device, an actuating lever mounted on the frame and arranged in the path of and adapted to engage with the said bar, and a rotary cam having a groove engaging the actuating lever and adapted to oscillate the same.

60. A machine of the class described including an oscillatory wire extension lever, means for swinging the same, a wire engaging device carried by the lever, a rotary bending device mounted on the lever and arranged to bend a wire around the said engaging device, means for turning the bending device, a locking device carried by the lever and arranged to engage the bending device to hold the same against rotary motion, and means arranged in the path of the locking device and adapted to actuate it to release the bending device.

61. A machine for binding bundles with wire bands including means for bending the end of the wire, means for operating the bending device, a movably mounted device having a projecting portion arranged to engage the bent end of the wire, and means for actuating the said projecting portion to release the wire.

62. A machine for binding bundles with wire bands including a pin having a projecting portion, means for engaging the wire to bend the same against the pin, and means for effecting the release of the wire from the pin.

63. A machine for binding bundles with wire bands including a pin having a projecting portion, means for engaging the wire to loop the same around the pin, and means for sliding the pin to withdraw the projecting end thereof from the looped end of the wire.

64. A machine for binding bundles with wire bands including a projecting wire engaging device, means for engaging the wire to bend the same against the said device, and a cutter arranged in the path of the wire for severing the same.

65. A machine for binding bundles with wire bands including a slidable pin having a projecting portion, a rotary bending device provided with means for engaging the wire to bend the same around the pin, means for operating the bending device, and means for withdrawing the pin from the bend.

66. A machine for binding bundles with wire bands including a relatively fixed cutter, a slidable wire engaging device having a projecting portion, a rotary bending device arranged to carry the wire against the cutter to sever the former and adapted to bend one end of the wire against the projecting portion, means for turning said bending device, and means for withdrawing the latter from the bend of the wire.

67. A machine for binding bundles with wire bands including a rotary bending device having an opening and provided with a projecting wire engaging lug, a pin slidable in the opening and having a projecting portion arranged in spaced relation with the lug, means for rotating the bending device to bend the wire against the pin, a cutter arranged in the path of the wire, and means for drawing the pin from the bent wire.

68. A machine for binding bundles with wire bands including a rotary cylindrical looping device having fixed and slidable means for engaging and looping the end of a wire, means for operating the looping device, means arranged to receive the looped portion of the wire, a relatively fixed cutter arranged in the path of the wire for severing the same, and means for releasing the loop from said device.

69. A machine for binding bundles with wire bands, including a slidable wire engaging device, means for bending the wire against the said device, means for operating the bending means, a movable wedge arranged to actuate the wire engaging device to withdraw the same from the bend of the wire, and means for operating the wedge.

70. A machine for binding bundles with wire including a rotary looping device arranged to loop one end of the wire, means for operating the looping device, means for engaging the looped end of the wire, means for drawing the wire outwardly, a locking device for holding the looping device against rotary movement while the wire is being drawn outwardly, and means for operating the locking device.

71. A machine for binding bundles with wire bands including a movable element, a rotary looping device mounted on the said element for looping one end of a wire, means for rotating the looping device, means also carried by the said device for engaging the looped end of the wire, means for moving the said element to draw out the wire and to feed the drawn out portion to a bundle, and a locking device for holding the looping device against rotary movement while the said element is in motion.

72. A machine for binding bundles with wire bands including a rotary wire end bending device, a support for the same, means for turning the binding device, a tapered lug eccentrically mounted on said device, and a cutter adjustably mounted on said support and adapted to coöperate with said lug to effect cutting of a band when the device is rotated.

73. A machine for binding bundles with wire bands including a rotary cylindrical wire end bending device, a support for the same, means for turning the bending device, a lug eccentrically mounted on said cylinder, and a cutter adjustably mounted at an angle to the cylinder and adapted to cooperate with said lug to effect cutting of a band.

74. A machine for binding bundles with wire bands including a wire engaging device, having a projecting wire engaging portion, means for looping the wire around the said projecting portion, said means being provided with a wire engaging portion arranged in spaced relation with the said projecting portion to form a wire receiving space or channel, and means for pressing the wire into the space or channel.

75. A machine for binding bundles with wire bands including a rotary wire looping device having a projecting lug, a wire engaging projection arranged in spaced relation with the said lug, a lever arranged to press the wire into the space between the projection and the lug, a bar connected with the looping device and adapted to rotate the same and provided with an arm arranged to oscillate the lever, and means for actuating the said bar.

76. A machine for binding bundles with wire bands including a wire looping device having an engaging portion, a relatively fixed wire engaging device arranged in spaced relation with the engaging portion of the looping device to form a space or channel, means for moving the wire into the said space or channel, and means for rotating the looping device to loop the wire around the said relatively fixed engaging device.

77. A machine for binding bundles with wire bands including a wire looping device having an engaging portion, a relatively fixed wire engaging device arranged in spaced relation with the engaging portion of the looping device to form a space or channel, means for moving the wire into the said space or channel, means for rotating the looping device to loop the wire around the said relatively fixed engaging device, and means for moving the wire engaging device from its engaging position to release the looped end of the wire.

78. A machine for binding bundles with wire bands including means for cutting and bending one end of a wire, means for engaging the bent end of the wire to hold the same, and a coiling device provided with means for engaging and coiling the bent end of the wire, and means for operating the coiling device.

79. In a machine for binding bundles with wire bands, means for bending one end of a wire, and means for coiling the end having the bend about a section of the wire to form a tie.

80 A machine for binding bundles with wire bands including means for coiling one end of a wire about a section of the wire, means for bending the end previous to the coiling, and means for bending the section after coiling.

81. In a machine for binding bundles with wire bands, means for coiling one end of a wire about a section thereof, means for bending the section beyond the coil, and means for severing the section after bending.

82. In a machine for binding bundles with wire bands, means for coiling one end of the wire about a section of the wire with the extremity of the coiled wire end left free of the coil, means for bending said section outside the coil, and means for severing the section after bending.

83. In a machine for binding bundles with wire bands, means for coiling one end of a wire about a section of the wire, means for bending the end, and means for bending the section after the coiling to engage with said bent end.

84. A machine for binding bundles with wire bands including means for coiling one end of a wire about a section of the wire, means for bending the end, means for bending the section, means for severing the section, and means for tucking the severed end beneath the wire band.

85. A machine for binding bundles with wire bands including means for bending an end of a wire, means for coiling that end about a section of the wire with the bend of the end free of the completed coil, and means for bending the section.

86. A machine for binding bundles with wire bands including means for bending an end of a wire, means for coiling that end about a section of the wire, with the bend of the end free of the completed coil, and means for bending the section against said bent end to turn the same along with the coil.

87. In a machine for binding bundles with wire bands, means for uniting one end of a wire with a section of the wire about the bundle, means for severing the section beyond the union, and means for tucking the severed end beneath the band.

88. A machine for binding bundles with wire bands having means for drawing out wire, means for putting the wire around a bundle, means for tying the wire with a loose end left extending beyond the knot, means for forcing the band out from the bundle, and means for tucking the loose end between the band and bundle.

89. A machine for binding bundles with wire bands including means for uniting terminals of a band, means for bending the knot against the band on the bundle face, and means for tucking a portion of the knot under the band.

90. A machine for binding bundles with wire bands including means for uniting the terminals of a band, means for bending the knot against the face of the bundle, means for forcing the band outwardly to provide a space for a portion of the knot, and means for tucking said portion under the band.

91. A machine for binding bundles with wire bands including means for uniting the terminals of a band, means for bending the knot against the face of the bundle, oscillatory means for raising the band to receive a portion of the knot, means for oscillating the band-raising means, and means for forcing said portion under the band.

92. A machine for binding bundles with wire bands including means for uniting the terminals of a band, means for positioning the knot against the face of the bundle, and means for tucking a portion of the knot under the band.

93. A machine for binding bundles with wire bands including means for coiling one end of a wire around another, means for bending the uncoiled end to complete the knot, and means for bending the knot.

94. A machine of the class described including means for coiling one end of a wire around another, and means for bending the other end of the wire independently of the coiled end upwardly and laterally at the outer end of the coil, whereby the two ends are secured together.

95. A machine for binding bundles with wire bands including means for placing a band under tension about a bundle, means for tying the band, means for moving the band to provide a space for an end of the band, and means for tucking the end into said space.

96. A machine for binding bundles with wire bands including means for coiling one end of a band around the other end, means for bending the uncoiled end, means for forcing the band outwardly to provide a space for the uncoiled end, and means for tucking the uncoiled end under the band.

97. A machine for binding bundles with wire bands including means for uniting the ends of a band, means for bending one of the ends and tucking the same beneath the band, an oscillatory finger provided with means for forcing the band outwardly to provide a space for the tucked end, and means for moving said finger.

98. A machine including means for coiling one end of a wire around another, a wire tying lever arranged to bend the uncoiled end of the wire to prevent the same from slipping through the coil, and means for actuating the wire-tying lever.

99. A machine for binding bundles with wire bands including means for coiling one end of a band around the other end, a wire tying lever provided with means for engaging the uncoiled end of the band, and means for actuating the wire tying lever to bend the uncoiled end of the band at the outer end of the coil.

100. A machine for binding bundles with wire bands including means for coiling one end of a band around the other, a wire tying lever provided with means for engaging the uncoiled end of the band, and means for actuating the wire tying lever to bend the uncoiled end of the band at the outer end of the coil and to tuck such uncoiled end under the band.

101. A machine for binding bundles with wire bands including means for coiling one end of a band around the other, a wire tying lever provided with means for engaging the uncoiled end of the wire, a crank element connected with the wire tying lever at a point intermediate of the ends thereof for actuating the same, means for operating the crank element, and means for guiding the lever to cause the same to bend the uncoiled end of the band at the outer end of the coil and carry such uncoiled end under the band.

102. A machine for binding bundles with wire bands including means for coiling one end of a band around the other, a wire tying lever provided at one end with means for engaging the uncoiled end of the band, a guide receiving the other end of the lever, a crank element connected with the lever at an intermediate point and adapted to actuate the same to bend the uncoiled end at the outer end of the coil and carry such uncoiled end under the band, and means for operating the crank element.

103. A machine for binding bundles with wire bands including means for coiling one end of a band around the other, a wire tying lever slidably mounted at one end and provided at the other end with a projecting arm or portion having means for engaging the uncoiled end of the band, and means connected with the lever for oscillating the same to bend the said uncoiled end and carry the same under the band.

104. A machine for binding bundles with wire bands including means for coiling one end of a band around the other, a wire tying lever provided with means for engaging the uncoiled end of the band, and means for actuating the wire tying lever to tuck the uncoiled end of the wire under the band.

105. A machine for binding bundles with wire bands including means for coiling one end of a band around the other, means for tucking the uncoiled end under the band, and means for engaging the band to prevent the same from moving with the tucking means.

106. A machine for binding bundles with wire bands including means for coiling one end of a band around the other, means for tucking the uncoiled end under the band, and means for forcing the band outwardly to provide a space for the uncoiled end, the latter means also having an engaging portion for preventing the band from moving in the direction of the tucking means.

107. A machine for binding bundles with wire bands including means for coiling one end of a band around the other, means for tucking the uncoiled end under the band, a movable finger provided with means for forcing the band outwardly to provide a space for the uncoiled end and having a shoulder for engaging the band to prevent the same from moving with the said means for tucking the wire under the band, and means for operating the finger.

108. A machine for binding bundles with wire bands including means for coiling one end of a band around the other, a wire tying lever provided with means for engaging the uncoiled end of the band, means for moving the lever to carry the uncoiled end beneath the band, a finger movable in the opposite direction from the lever and provided with an engaging portion arranged to form a stop for the band, the finger and the lever being movable to a position in overlapped relation, and means for operating the finger.

109. A machine for binding bundles with wire bands including means for coiling one end of a band around the other, means for bending the uncoiled end and for tucking the same under the band, a movable finger provided with a tapered or wedge-shaped portion arranged to force the band outwardly to provide a space for the uncoiled end, and means for operating said finger.

110. A machine for binding bundles with wire bands including means for coiling one end of a band around the other, a wire tying lever provided with means for engaging the uncoiled end of the band, means for actuating the lever to bend the uncoiled end and carry the same beneath the band, a movable finger provided with means for forcing the band outwardly to provide a space for the lever and the uncoiled end, and means for operating said finger.

111. A machine for binding bundles with wire bands including means for uniting the ends of a band, a lever provided with means for engaging one of the ends of said band, means for moving the lever to carry said end beneath the band, a finger movable in the opposite direction from the lever and provided with means for forcing the band outwardly to receive said end, and means for operating said finger.

112. A machine for binding bundles with wire bands including means for coiling one end of a band around the other, a wire tying lever provided with means for engaging the uncoiled end of the band, means for moving the lever to carry the said uncoiled end beneath the band, a finger movable in the opposite direction from the lever and provided with means for forcing the band outwardly and having a shoulder to form a stop or abutment for the band, the finger and the lever being movable to a position in overlapping relation, and means for operating said finger.

113. A machine for binding bundles with wire bands including means for coiling one end of a band around the other, a wire tying lever provided with means for engaging the uncoiled end of the band, a shaft having a crank element connected with the wire tying lever and arranged to actuate the same, a pinion mounted on the crank shaft, a gear meshing with the pinion and having a crank pin, a cam actuated lever, and means for connecting the latter with the crank pin of the gear.

114. A machine for binding bundles with wire bands including means for coiling one end of a band around the other, a wire tying lever having means for engaging the uncoiled end of the band, a crank shaft having a crank element connected with and actuating the wire tying lever, a rotary cam, means for turning said cam, a lever actuated by the cam, and means for transmitting motion from the cam actuated lever to the crank shaft.

115. In a machine for binding bundles of incompressible material, means for wrapping a bundle with a band, means for tying the band with one end left loose, a band engaging finger having a wedge-shaped terminal portion with a shoulder, means for moving the finger, said finger acting to force the tied band outwardly from the bundle with the shoulder abutted against the band, and means for tucking the loose end under the band when forced outwardly.

116. In a machine for binding bundles of incompressible material, means for wrapping a bundle with a band, means for tying the band with one end left loose, a finger having a wedge-shaped terminal portion with a shoulder, means for bending said loose end toward the bundle, over the wedge-shaped terminal portion and along the finger, and means for operating said finger to force the tied band outwardly from the bundle with the shoulder abutted against the band and to withdraw the finger whereby the tied band closes down upon the bent loose end to hold the same.

117. A machine for binding bundles with wire bands comprising a coiling device for coiling one end of a wire around the other end of the wire with the first coil formed against the bundle, a mounting for said coiling device whereby it will recede from the bundle as the subsequent coils are made, and means for operating the coiling device.

118. A machine for binding bundles with wire bands, a coiling device for coiling one end of a tying wire around the other end of the wire, means for operating the coiling device, said device operating to begin the coiling operation by forming the first coil against the bundle, said coiling device continuing the coiling operation and receding from the bundle as the subsequent coils are made, and means for bending the end of the uncoiled wire laterally relative to the coils at the end of the coiling operation.

119. In combination, mechanism for directing a wire about a bundle and tensioning said wire during the directing thereof, and mechanism for coiling a portion of one stretch of the wire about a second stationary stretch thereof, the coiling being initially started against the bundle and formed outwardly therefrom.

120. In combination, mechanism for directing a wire about a bundle, and tensioning said wire during the directing thereof, mechanism for coiling a portion of one stretch of the wire about a second stationary stretch thereof, the coiling being initially started against the bundle and formed outwardly therefrom, and means for severing the wire beyond the coils.

121. In combination, mechanism for directing a wire about a bundle and tensioning said wire during the directing thereof, mechanism for coiling a portion of one stretch of the wire about a second stationary stretch thereof, the coiling being initially started against the bundle and formed outwardly therefrom, means for severing the wire beyond the coils, and means for distorting the uncoiled end of the wire to prevent the pulling of the same through the coils.

122. In a machine for binding bundles of incompressible material with wire bands, the combination of means for directing a wire about a bundle and tensioning said wire during the directing thereof, knotter mechanism for uniting the wire with a section thereof at the point of meeting, said mechanism operating to form the tie initially against the bundle and containing the formation of the tie and receding from the bundle as the tie is elongated.

123. In a machine for binding bundles of incompressible material, the combination of means for placing a band around a bundle, knotter mechanism for tying one end of the band to a section thereof, the tie or knot formed being located at one of the lower edges of the bundle and projecting from the latter, means for severing the wire beyond the tie and means carried by the knotter mechanism for bending the tie against one of the faces of the bundle.

124. In a machine for binding bundles of incompressible material, the combination with a bundle support, means for moving the bundle on said support, means for arranging the band around the bundle while on the support, knotter mechanism located at the lower edge of the bundle for tying the band, and means brought into action after completion of the knot to engage the knot and bend the same against the bundle.

125. In a machine for binding bundles of incompressible material, the combination of means for placing a band around a bundle, means for coiling or wrapping one end of the band around the other, and means for bending the uncoiled end of the band at a point beyond the coil to prevent it from slipping through the same and for also bending the coil into the plane of and in close proximity to the bundle.

126. A machine for binding bundles with wire bands comprising, in combination, means for binding the bundle with a tensioned binding element, means for tying said element, means for cutting the element, and means for bending the knot toward the bundle.

127. A machine for binding bundles with wire bands, including in combination, a binder tying device, means for operating the tying device, a knot bending device independent of the tying device, and means for actuating the bending device.

128. In a machine for binding bundles with wire bands, means for bending down a knot tied in a wire around a bundle comprising a swingably mounted member adapted to engage the wire and place the knot into a position against the bundle, and means for operating the swingable member.

129. In a machine for binding bundles with wire bands, in combination, a binder tying mechanism, means for operating said mechanism, a binder carrier movable to and from said mechanism, means for operating the carrier, and a knot tucking device.

130. In a machine for binding bundles of incompressible material, means for placing a band about a bundle with the terminals of the band brought together and crossing each other, means operative to unite the ends of the band, and means for bending one end upwardly between the bundle and the band.

131. In a machine for binding bundles of incompressible material, means for placing a band around a bundle with the terminals of the band brought together, means operative to coil one terminal about the other, and means for bending the other terminal to prevent its slipping through the coiled terminal.

132. In a machine for binding bundles of incompressible material, the combination of means for placing a band about a bundle with the terminals of the band brought together, mechanism operative to coil one terminal about the other, and mechanism to form a means outside the coil for preventing the other terminal slipping through said coil.

133. A machine for binding bundles of incompressible material including a rotary coiling device provided with a slot arranged to receive one end of a wire, said device being also provided with means for engaging the other end of the wire and adapted when rotated to coil such end, means for operating the coiling device, around the first mentioned end, and means for bending the latter at the outer end of the coil, whereby the two ends are connected.

134. A machine for binding bundles of incompressible material including a rotary coiling device having a slot adapted to receive one end of a wire band and provided with means for engaging the other end of the band for coiling the same around the first mentioned end, means for operating the coiling device, and means for bending the latter at the outer end of the coil and for bending the coil.

135. A machine for binding bundles of incompressible material including a rotary device having a slot to receive one end of a wire band and provided with means for engaging the other end of the band for coiling the same around the first-mentioned end, means for operating the coiling device, and means for bending the uncoiled band end at the outer end of the coil and for tucking the said end under the band.

136. In a machine for binding bundles of incompressible material, the combination with means for placing a band around a bundle with the terminals of the band at one of the lower corners of the bundle, a knotter provided with a slot to receive one of the terminals of the band and having means for engaging the other terminal of the band to unite the same with the first mentioned terminal, means for operating the knotter, and means for bending the knot against the bundle.

137. A machine for binding bundles with wire bands including a rotary coiling device having a wire-receiving slot, means for operating the coiling device, said device also having a projecting lug at one end for engaging with a terminal of said wire whereby said terminal may be coiled about the other terminal of the wire, and means for mounting the coiling device and moving the same so that it has a longitudinal movement with respect to the stationary wire when the coil is being formed.

138. A machine for binding bundles with wire bands including a rotary coiling device having a slot opening through three faces thereof to receive one terminal of a band and provided at one end with a projecting lug arranged to engage the other terminal of a band for coiling the same around the first-mentioned terminal, said coiling device being disposed for rotation beneath said other terminal of the band at substantially right angles thereto, means for slidably mounting the coiling device to permit the same to follow the lead of the coil, and means for rotating the coiling device.

139. In a machine for binding bundles with wire bands, a knotter mechanism including a rotary knotter head, a gear secured to said head in coaxial relation therewith and intermediate the ends of said head, means for driving said gear, means meshing with the gear to rotate the head, and means to permit the head moving longitudinally during the knotting operation.

140. A machine for binding bundles with wire bands including a rotary coiling device provided with means for engaging one terminal of a band for coiling the same around the other terminal thereof, said coiling device being provided with a pinion, means for slidably mounting the coiling device to permit the same to follow the lead of the coil, a gear meshing with the pinion and having its teeth arranged at an inclination so as to rotate the coiling device without getting out of mesh with the pinion thereof, and means for driving said gear.

141. A machine for binding bundles with wire bands including a rotary coiling device having a pinion, an actuating gear meshing with the pinion and having its rim inclined or spirally arranged, means for driving said gear, a stem slidably mounted at the center of the gear and provided with a support carrying the coiling device, and means for guiding the support in the sliding movement of the stem.

142. A machine for binding bundles with wire bands including a rotary coiling device having a pinion, a gear meshing with the pinion, a crank shaft, gearing connecting the crank shaft with the said gear, and a lever connected with the crank shaft for rotating the same, a cam for actuating the lever, and means for driving the cam.

143. A machine for binding bundles with wire bands including a rotary coiling device having a horizontal pinion, a vertical shaft, a gear arranged at the upper end of the vertical shaft and meshing with the pinion of the coiling device, a horizontal crank shaft, gearing for connecting the crank shaft with the vertical shaft, and a lever connected with the crank shaft for rotating the same, a cam for actuating said lever, and means for driving the cam.

144. A machine for binding bundles with wire bands including a rotary coiling device having a pinion, a gear meshing with the pinion, a crank shaft, gearing for transmitting motion from the crank shaft to the said gear, a rotary cam, means for driving said cam, an oscillatory lever actuated by the cam, and means for connecting the lever with the crank shaft.

145. A machine for binding bundles with wire bands including a rotary coiling device provided with means for coiling one end of a band around the other, a slidable carrier movable backwardly and forwardly to carry the coiling device to and from the engaging position thereof, means for bending the other end of the wire to prevent the working of the same out of the coiled end, means mounted on the carrier for rotating the coiling device, and cam actuated means for reciprocating the carrier.

146. In a machine for binding bundles with wire bands, the combination of means for placing a band around a bundle with the terminals of the band brought together at one of the corners of the bundle, and a rotary coiling device having a slot to receive one of the terminals of the band and operable to coil the other terminal around the terminal in the slot.

147. A machine for binding bundles with wire bands including a rotary coiling device constructed to receive one terminal of a band through its periphery to a point centrally thereof and provided with means arranged to engage the other terminal of the band for coiling or wrapping the same around the first-mentioned terminal, said rotary coiling device being also movable in a direction longitudinally of the coil so as to follow the lead of said coil, and means for rotating the coiling device.

148. A machine for binding bundles with wire bands including a rotary coiling device having a slot to receive one terminal of a band and provided with means for engaging the other terminal of the band to coil or wrap the same around the first-mentioned terminal, means for operating said coiling device, said coiling device being movable in a direction longitudinally of the coil so as to follow the lead of the same, and means for bending the uncoiled terminal beyond the coil.

149. A machine for binding bundles with wire bands including a rotary coiling device having a pinion and also movable in a direction longitudinally of its axis of rotation so as to follow the lead of a coil in making the same, an actuating gear having its teeth set at an inclination or spirally arranged, whereby it is adapted to rotate the pinion without getting out of mesh with the same, and means for operating the gear.

150. A machine for binding bundles with wire bands including a rotary coiling device provided with means for coiling one end of a band around the other, a carrier movable backwardly and forwardly to carry the coiling device to and from its engaging position, a wire tying lever provided with means for engaging the uncoiled end and movable to tuck the same beneath the band, a band engaging finger provided with means for forcing the band outwardly to form a space for the said uncoiled end, and means for operating each of the specified machine parts.

151. A machine for binding bundles of incompressible material including bundle binding means, means for feeding wire to the binding means, and a brake for controlling the tension of the wire as it is applied to the bundle.

152. A machine for binding bundles of incompressible material including a bundle binding means, a binder tensioning device, a binder brake for controlling the tension of the wire as it is applied to the bundle, and a slack take-up device connected with the brake.

153. A machine for binding bundles with wire bands, comprising a wire tension device, a brake connected with the tension device for preventing the feed of the wire, and means for regulating the pressure of said device.

154. A machine for binding bundles of incompressible material including a wire extension lever for drawing a wire outwardly preparatory to placing the same about a bundle, means for operating the wire extension lever, a wire tensioning device, and a device for taking up slack in the wire.

155. A machine for binding bundles of incompressible material including a wire extension lever for drawing a wire outwardly preparatory to placing the same about a bundle, means for operating the wire extension lever, actuating means for said lever, yieldable means for connecting the lever with the actuating means, a wire tensioning device, and a device for taking up slack in the wire.

156. A machine for binding bundles of incompressible material including a wire extension lever for drawing a wire outwardly preparatory to placing the same about a bundle, means for operating the wire extension lever, a wire tensioning device, and a brake for stopping feed of the wire when the wire slackens.

157. A machine for binding bundles of incompressible material including a wire extension lever for drawing a wire outwardly preparatory to placing the same about a bundle, means for operating the wire extension lever, actuating means for said lever, yieldable means for connecting the lever with the actuating means, a wire tensioning device, and a brake for stopping feed of the wire when the wire slackens.

158. A machine for binding bundles with wire bands provided with a slack take-up device comprising a pivotally mounted oscillatory arm provided with a guide wheel arranged to receive the wire, and a spring connected with the arm for urging the same against the wire.

159. A machine for binding bundles with wire bands including brake mechanism for controlling the feeding of a wire, and means for automatically operating the brake to release the wire when there is a predetermined tension on the same and for applying the brake when the wire slackens and the tension thereon decreases.

160. A machine for binding bundles with wire bands including a wire tension device, a brake connected with the tension device for preventing the feeding of the wire, and means controlled by the tension on the wire for automatically operating the brake to release the wire when there is a predetermined tension on the same and to apply the brake when the wire slackens and the tension thereon decreases.

161. A machine for binding bundles with wire bands including a wire tension device having wheels between which the wire passes, a brake connected with the tension device for preventing the feeding of the wire, and means controlled by the tension on the wire for automatically operating the brake to release the wire when there is a predetermined tension on the same and to apply the brake when the wire slackens and the tension thereon decreases.

162. A machine for binding bundles with wire bands including a movably mounted slack take-up device having means for yieldably holding it in engagement with the wire to maintain the latter under a constant tension, and a brake for the wire arranged to be operated automatically by the slack take-up device.

163. A machine for binding bundles with wire bands including an oscillatory slack take-up device comprising an arm movable toward and from the binding chamber, means for yieldably urging the arm outwardly to maintain the wire under a tension, and a wire holding brake automatically actuated by the slack take-up device.

164. A machine for binding bundles with wire bands including a wire tension device having wheels between which the wire passes, a brake connected with the tension device for preventing the feed of the wire, and a yieldably mounted slack take-up device movable toward and from the binding chamber and adapted to maintain a pressure on the wire.

165. A machine for binding bundles with wire bands including a wire tension device having wheels between which the wire passes, a brake connected with the tension device for preventing the feed of the wire, and a yieldably mounted slack take-up device movable toward and from the binding chamber and adapted to maintain a constant pressure on the wire, and provided with means for automatically operating the break to apply the latter when the wire is slackened and to release the brake when the tension on the wire increases.

166. A machine for binding bundles with wire bands including a wire tension device provided with relatively adjustable wheels between which the wire passes, a brake connected with the tension device and having a projecting operating portion, a pivotally mounted slack take-up device adapted to maintain a tension on the wire and provided with means for engaging the operating portion of the brake to operate the latter automatically.

167. A machine for binding bundles with wire bands including a wire tension device provided with relatively adjustable wheels between which the wire passes, a brake connected with the tension device and having a projecting operating portion, and an oscillatory slack take-up device provided with a pivot having a head or portion movable into and out of engagement with the operating portion of the brake, whereby the latter is automatically controlled by the slack take-up device.

168. A machine for binding bundles with wire bands including a slack take-up device having yieldable means for moving it outwardly against the wire to maintain the same under a tension, said take-up device being adapted to be forced inwardly by the wire, and means for automatically checking the feed of the wire, said means being arranged to be engaged by the inward movement of the take-up device to release the wire, whereby the latter is fed under a constant predetermined tension.

169. A machine for binding bundles with wire bands including a slack take-up device provided with means for receiving and guiding the wire, a spring for urging the take-up device to maintain a substantially constant tension on the wire, and means operated by the take-up device for checking the feed of the wire.

170. A machine for binding bundles with wire bands including a needle bar, an element connected to the needle bar for laying the wire about one side of the bundle, and means on the element for maintaining a tension in a wire engaged by the needle bar.

171. A machine for binding bundles with wire bands including a needle bar, an element connected to the needle bar for laying the wire about one side of the bundle, and means on the element for taking up slack in a wire engaged by the needle bar.

172. A machine for binding bundles with wire bands including a needle bar, an element connected to the needle bar for laying the wire about one side of the bundle, and means on the element for stopping feed of a wire engaged by the needle bar.

173. A machine for binding bundles with wire bands including a needle bar, an element connected to the needle bar for laying the wire about one side of the bundle, slack take-up means on the element, and wire brake means also on the element.

174. A machine for binding bundles with wire bands including a needle bar, an element pivotally connected with the needle bar for laying the wire about one side of the bundle, means on the element for holding a reel, and means carried by the swinging element for maintaining the lead from the reel under a tension.

175. A machine for binding bundles with wire bands, comprising a guide, a vertically movable needle bar, a swinging frame pivoted to the needle bar and slidable in said guide, means on the frame for holding a reel, and means carried by the swinging frame for maintaining the lead from the reel under a constant tension.

176. A machine for binding bundles with wire bands including a vertically movable needle bar, a swinging frame pivoted at one end of the needle bar, means for slidably mounting the other end of the swinging frame, and means carried by the swinging frame for maintaining the wire under a constant tension.

177. A machine for binding bundles with wire bands including a needle bar, an element connected with the needle bar for laying the wire about one side of the bundle, means carried by the element for maintaining the wire under a tension, and a brake controlled by the tension means.

178. A machine for binding bundles with wire bands including a vertically movable needle bar, a swinging frame pivoted at one end to the needle bar, means for slidably mounting the other end of the swinging frame, means carried by the swinging frame for maintaining the wire under a constant tension, and a brake automatically controlled by the tension means.

179. In a machine for binding bundles with wire bands, a needle bar, a swinging frame connected with and actuating the needle bar, a wire support, a slack take-up device mounted on the swinging frame for maintaining the wire under a constant tension, and a brake for the wire automatically operated by the slack take-up device.

180. In a machine for binding bundles with wire bands, a needle bar for laying the wire about one side of the bundle, an element connected with the needle bar, and a pivoted spring actuated slack take-up arm carried by the element for maintaining the wire in a taut condition.

181. A machine for binding bundles with wire bands including a reciprocatory needle bar, a swinging frame connected with the needle bar, a pivoted spring actuated slack take-up arm carried by the swinging frame for maintaining the wire under a tension, and a brake automatically controlled by the said arm.

182. A machine for binding bundles with wire bands including a swinging frame, a needle bar connected with the frame, a slack take-up device consisting of an oscillatory arm pivotally mounted on and carried by the swinging frame and a spring connected with the arm and with the swinging frame for urging the former against the wire to maintain the latter under a constant tension.

183. A machine for binding bundles with wire bands including a needle bar, a swinging frame connected with the needle bar, a slack take-up device comprising an arm pivotally mounted on the swinging frame and provided with wire guiding means, blocks pivoted to the swinging frame and to the arm, and a spring connected with the blocks and arranged to urge the arm against the wire.

184. A machine for binding bundles with wire bands including a needle bar provided at its upper and lower ends with wire guiding means, a swinging frame slidably and pivotably mounted and connected to the needle bar, and means carried by the swinging frame and arranged to engage the wire to maintain the same under a tension.

185. In a machine for binding bundles of incompressible material, a needle bar operative to lay a wire about one side of the bundle, and means coöperating with the needle bar for preventing slack in the wire in the reverse movement of said bar and also for controlling the tension on the wire as the wire is being laid about the bundle.

186. A machine of the class described including a reciprocatory needle bar, mechanism connected with the needle bar for actuating the same, and means carried by an element of the said mechanism for maintaining a wire under a constant tension.

187. A machine for binding bundles with wire bands including a reciprocatory needle bar, mechanism connected with the needle bar for actuating the same, means carried by an element of the said mechanism for maintaining the wire under a tension, and a brake for the wire automatically controlled by the tension means.

188. A machine for binding bundles with wire bands including a reciprocatory needle bar, mechanism for actuating the same, means for maintaining a wire under a tension, and brake mechanism controlled by the tension means and adapted when applied to prevent feeding of the wire.

189. A machine for binding bundles with wire bands including a reciprocatory needle bar, mechanism connected with the needle bar for actuating the same, a spring actuated slack take-up device for maintaining a wire under a constant tension, and a brake for the wire operated by the said slack take-up device.

190. A machine for binding bundles with wire bands including a reciprocatory needle bar, a guide, a swinging frame pivotally and slidably mounted in the guide and pivotally connected to the needle bar, and actuating mechanism connected to the swinging frame for oscillating the same to reciprocate the needle bar.

191. A machine for binding bundles with wire bands including spaced guides, an oscillatory frame having spaced portions provided with wheels mounted in the said guides, a removable reel supporting rod extending across the space between the said spaced portions and carried by the swinging frame, a needle bar pivoted to the swinging frame, and means for oscillating the swinging frame to reciprocate the needle bar.

192. A machine for binding bundles with wire bands including a needle bar, a rock shaft, means connecting the needle bar with the rock shaft, a bar or pitman connected with the rock shaft for oscillating the same, a cam actuating said pitman, and means for driving the cam whereby the needle bar is actuated.

193. A machine for binding bundles with wire bands including a reciprocatory needle bar, a slidably and pivotally mounted swinging frame pivotally connected to the needle bar, a rock shaft having an arm connected with the swinging frame, a bar or pitman connected with the rock shaft for oscillating the same, a cam actuating said pitman, and means for driving the cam.

194. A machine for binding bundles with wire bands including a reciprocatory needle bar, a swinging frame pivoted to the same, a rock shaft having an arm, means for transmitting motion from the rock shaft to the swinging frame, a shaft, a reciprocatory bar or pitman pivoted at one end to the arm of the rock shaft and provided at the opposite end with a slot through which the shaft passes, and a rotary cam element mounted on the shaft and actuating the reciprocatory bar or pitman, and means for driving the cam element.

195. A machine for binding bundles with wire bands including a main frame, an auxiliary frame adjustably mounted on the main frame, upper and lower shafts journaled on the main frame, a swinging frame carried by the auxiliary frame, a needle bar connected with the swinging frame, a rotary cam element mounted on the lower shaft, means for driving the cam, a bar or pitman actuated by the cam element and connected with the upper shaft, and an arm slidably mounted on the upper shaft and connected with the swinging frame.

196. A machine for binding bundles of incompressible material including a needle bar for directing the wire about the bundle, a knotting mechanism coöperating with the needle bar, means for adjusting the range of movement of the needle bar to properly position the wire in the knotter, and means for actuating the needle bar.

197. In a machine for binding bundles of incompressible material, including bundle forming mechanism, means for changing the size of the bundles, a needle bar for directing the wire about the bundles, means for adjusting the range of movement of the needle bar to correspond with the face of the bundle, and means for actuating the needle bar.

198. A machine for binding bundles with wire bands including a needle bar, a swinging element connected to the needle bar, a rock shaft mounted beneath the swinging element, means adjustably connecting the rock shaft to the swinging element, and means for oscillating the rock shaft to move the needle bar.

199. A machine for binding bundles with wire bands including a needle bar, a swinging frame connected to the needle bar, a link pivotally connected with the swinging frame, a rock shaft mounted beneath the swinging frame, an arm secured at one end to the rock shaft to turn therewith, said arm being curved upwardly and having a pivotal connection with the link, and means whereby the link may be adjusted along the arm to vary the position of the swinging frame.

200. A machine for binding bundles with wire bands including a reciprocatory needle bar, means for guiding the same, a slidably mounted swinging frame connected with the needle bar, and means for actuating the swinging frame.

201. In a machine for binding bundles with wire bands having a knotter head, a wire engagement means for holding the free end of a wire, means for guiding a wire to properly position the same against the bundle, into the knotter head and into the wire engagement means, said means also presenting a section of the wire in position for the succeeding bundle.

202. A machine for binding bundles with wire bands including a needle bar, means for actuating the same, means for moving the bundle to place a wire about three sides of the bundle, said needle bar constituting wire guiding means for directing a wire about the fourth side of the bundle, the needle bar presenting a strand of wire in place for receiving the succeeding bundle.

203. A machine for binding bundles with wire bands including spaced apart frame members, a movable needle bar, means for actuating the needle bar, wire engaging means on one of the frame members, the needle bar being mounted on the other frame member, said needle bar constituting wire guiding means for presenting a strand of wire across the space between the frame members to the wire engagement means, and a tension device for the wire.

204. A machine for binding bundles with wire bands including spaced apart frame members, a needle bar movable in a vertical plane mounted on one of the frame members, means for engaging the free end of a wire mounted on the opposite frame member, means associated with the needle bar for maintaining the wire under substantially constant tension, said needle bar constituting wire guiding means to place a wire in position in front of a bundle while at the same time presenting a substantially vertical strand of wire in position to receive the succeeding bundle.

205. A machine for binding bundles of incompressible material comprising a wire guide, a wire extension lever movable toward and from the guide and provided with means for holding the end of a wire, means for forcing a bundle against the wire to encompass the top, bottom and back of the bundle, a movable needle bar normally located to one side of the path of movement of the bundle and adapted to place the wire against the front of the bundle, and means for connecting the ends of the wire.

206. A machine for binding bundles with wire bands, comprising means for supporting a wire reel, a wire guide so arranged as to be spaced from the supporting means, a wire extension lever movable toward and from the guide and provided with means for holding the end of a wire, means for feeding a bundle of material between the reel supporting means and the extension lever against the wire to form the top, bottom, and back of the band, a vertically movable needle bar normally located above the path of movement of the bundle and movable downwardly to place the wire against the front of the bundle and complete the band, means for connecting the ends of the band, and means for severing the wire.

207. A machine for binding bundles with wire bands including a wire guiding needle bar, a wire slack take-up device, and a wire extension lever.

208. A machine for binding bundles with wire bands including a needle bar, a wire extension lever, and means for tensioning a wire extending from the needle bar to the wire extension lever.

209. A machine for binding bundles with wire bands including a needle bar, wire tensioning means, a slack take-up device, and a wire extension lever.

210. A machine for binding bundles with wire bands including a needle bar, wire tensioning means, a wire extension lever, and yieldable means for connecting the wire extension lever to its actuating means.

211. A machine for binding bundles with wire bands including a needle bar, wire tensioning means, a wire extension lever, actuating means for the lever, yieldable means for connecting the lever with its actuating means and a slack take-up device.

212. A machine for binding bundles with wire bands including a reciprocatory needle bar, mechanism connected with the same for actuating the needle bar, a take-up device for maintaining a wire under a constant tension, and an oscillatory extension lever provided with means for holding the end of the wire and adapted to draw the latter outwardly.

213. A machine for binding bundles with wire bands including a reciprocatory needle bar, mechanism connected with the needle bar for actuating the same, a pivoted spring actuated slack take-up arm for maintaining a wire under a constant tension, and an oscillatory wire extension lever provided with means for holding the end of the wire and adapted to draw the latter outwardly.

214. A machine for binding bundles with wire bands including means for securing a band about a bundle, said means comprising a needle bar, a wire extension lever, and a knotter mechanism, all of said elements being movable toward and away from a corner of the bundle.

215. A machine for binding bundles with wire bands having means for securing a band about a bundle, said means comprising a needle bar, a wire extension lever, and a knotter mechanism, means for moving the wire extension lever to a position adjacent a corner of the bundle, means for moving the needle bar in juxtaposition to the end of the wire extension lever, and means for moving the knotter mechanism close to the other two parts.

216. A machine for binding bundles with wire bands having means for securing a band about a bundle, said means comprising a needle bar, a wire extension lever, and a knotter mechanism, means for swinging the lever to a position adjacent a corner of the bundle, means for then moving the needle bar across the face of the bundle to a position close to the lever end, means for sliding the knotter mechanism into operative position near the other two parts, and means for retracting all three parts after the knot is made.

217. A machine for binding bundles with wire bands including means for wrapping a band about a bundle, means for holding the free end of the band during the wrapping operation, means for releasing the end of the band, means for uniting the end with a section of the band, means for severing the section, and means for engaging with the end of the wire cut free from the bundle to draw the wire outwardly in preparation for the next bundle.

218. The combination with a main frame, of a plurality of laterally adjustable interdependent coöperating unit mechanisms each having means for drawing out and placing bands around bundles, means for tying the ends of the bands, means for severing the bands whereby the wire placed about the bundle is severed and a section retained for engagement with the succeeding bundle and for catching hold the free ends of the bands.

219. The combination with a main frame, of a plurality of laterally adjustable interdependent coöperating unit mechanisms each having means for drawing out and placing bands around bundles, means for tensioning the bands, means for tying the ends of the bands while under tension, means for severing the bands whereby the wire placed about the bundle is severed and a section retained for engagement with the succeeding bundle and for catching hold the free ends of the bands.

220. A machine for binding bundles with wire bands, including a wire extension element, means for operating the same, means mounted on the wire extension element for effecting gripping and securing of the end of a wire and also for severing the wire, and means for operating the last-named means.

221. A machine for binding bundles with wire bands including a rotary wire engaging and holding device, a support for the same, and a combined cutter and gripping jaw mounted on said device and adapted to effect both the cutting of the wire and the securing of the free end of the wire after cutting.

222. In a machine for binding bundles with wire bands, a frame having a passageway therein, means mounted on the frame for extending a wire across the front of said passageway, means for holding the free end of the wire so extended, means for causing relative movement of the wire and bundle, whereby the bundle is inclosed on three sides, means for laying the wire against the fourth side, means for tying the wire, and means for tucking the knot.

223. A machine for binding bundles with wire bands including a frame, a wire extension arm mounted on the frame, unitary means rotatably mounted on the arm for gripping the wire and also for cutting the wire, and means for moving a portion of the gripping means to effect releasing of the wire.

224. A machine for binding bundles with wire bands including a frame, a wire extension arm mounted on the frame, means for operating the wire extension arm, unitary means rotatably mounted on the arm for gripping the wire and also for cutting the wire, a slidable means forming a portion of the first-named means and positively actuated to release the wire.

225. In a machine for binding bundles with wire bands, the combination of means for progressively feeding a bundle of incompressible material, a support for the bundle as it is fed, a movable needle bar for guiding a wire into the path of the bundle whereby movement of the bundle causes partial envelopment of the same by the wire, the needle bar completing the envelopment of the bundle, and means for delivering the wire to the needle bar in a tensioned state.

226. In a machine for binding bundles of incompressible material, laterally spaced apart bundle supporting elements, means for pushing a bundle along said elements against a strand of wire and into binding position, wire knotter mechanism positioned between said bundle supporting elements, an oscillatory needle bar positioned above and coacting with said knotter mechanism to position the wire and complete the inclosure of the bundle and permit tying of the band by the knotter mechanism, and means for actuating each of the aforesaid means during a complete cycle of the machine.

227. In a machine for binding bundles of incompressible material, a frame, a wire tension device, a bundle support, means for pushing a bundle along said support and against a substantially vertical strand of wire whereby the bundle is inclosed by the wire on three sides, wire guiding means for inclosing the fourth side, means for knotting the band at the point of closure, means for severing the band, means for gripping and holding the end of the wire for the next operation, means for actuating each of the aforesaid means in sequence whereby the binding operation is completed during a complete cycle of the machine.

228. In a machine for binding bundles of incompressible material, a frame having laterally spaced apart bundle-supporting elements, means for moving a bundle along said bundle-supporting elements into binding position and holding the bundle during the binding operation, a reciprocatory needle bar supported on the frame above said bundle-supporting elements and movable through the space between said supporting elements, a wire knotting mechanism supported on the frame below said bundle-supporting elements, said needle bar coacting with said wire knotting mechanism to deliver the wire thereto in the path of the bundle-moving means so that the bundle is moved against a substantially vertical strand of wire causing the bundle to be inclosed by the wire on three sides, the needle bar being actuated to inclose the fourth side, means for tensioning the wire as it is being drawn out to envelop the bundle, said wire knotting mechanism forming the knot on the band substantially at the lower edge of the bundle, means for severing the band, and means for gripping the end of the wire beyond the knot for the next operation, said means operating in such order whereby the binding operation is completed during a complete cycle of the machine.

229. The combination in a bundling and tying machine, of means for forming bundles of predetermined dimensions, means for supporting the formed bundle, means for guiding a wire into the path of the bundle in advance thereof, means for pushing the bundle along said support against said wire into a bundle receiving chamber, the guiding means moving the wire in the rear of the bundle to complete envelopment of the same, and means for tying the wire upon the completion of the envelopment and severing the same.

In testimony that I claim the foregoing as my own, I have hereunto affixed my signature.

JAMES MARSHALL LEAVER, Jr.